(12) United States Patent
Tsuchiya et al.

(10) Patent No.: US 10,397,544 B2
(45) Date of Patent: Aug. 27, 2019

(54) THREE-DIMENSIONAL OBJECT DETECTION DEVICE AND THREE-DIMENSIONAL OBJECT DETECTION METHOD

(75) Inventors: Chikao Tsuchiya, Yokohama (JP); Hiroyuki Furushou, Atsugi (JP); Shinya Tanaka, Zama (JP); Yasuhisa Hayakawa, Sagamihara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 674 days.

(21) Appl. No.: 13/817,011

(22) PCT Filed: Jul. 29, 2011

(86) PCT No.: PCT/JP2011/067456
§ 371 (c)(1),
(2), (4) Date: Feb. 14, 2013

(87) PCT Pub. No.: WO2012/023412
PCT Pub. Date: Feb. 23, 2012

(65) Prior Publication Data
US 2013/0141542 A1     Jun. 6, 2013

(30) Foreign Application Priority Data

Aug. 19, 2010   (JP) .................................. 2010-183645

(51) Int. Cl.
*H04N 13/204* (2018.01)
*G06T 3/00* (2006.01)
(Continued)

(52) U.S. Cl.
CPC ....... *H04N 13/204* (2018.05); *G06K 9/00201* (2013.01); *G06K 9/00805* (2013.01);
(Continued)

(58) Field of Classification Search
USPC ........................................................... 348/46
See application file for complete search history.

(56) References Cited

U.S. PATENT DOCUMENTS 5,889,878 A   3/1999   Togashi
5,963,664 A   10/1999  Kumar et al.
(Continued)

FOREIGN PATENT DOCUMENTS

CN   1673679 A      9/2005
EP   1 826 648 A2   8/2007
(Continued)

OTHER PUBLICATIONS

Philippine Office Action, dated May 22, 2014, 2 pages.
(Continued)

*Primary Examiner* — Jefferey F Harold
*Assistant Examiner* — Sihar A Karwan
(74) *Attorney, Agent, or Firm* — Foley & Lardner LLP

(57) ABSTRACT

A three-dimensional object detection device 1 includes a camera 10 and a calculator 20. The calculator 20 performs viewpoint conversion processing on an image captured by the camera 10 to create a bird's eye view image, calculates, for each of a plurality of positions along a vertical imaginary line extending in a vertical direction in an actual space, a luminance difference between two pixels near the position, and detects a three-dimensional object on the basis of continuities of the calculated luminance differences of the respective positions.

11 Claims, 18 Drawing Sheets

(51) Int. Cl.
*G06T 7/12* (2017.01)
*G06K 9/00* (2006.01)
*G06K 9/46* (2006.01)

(52) U.S. Cl.
CPC ............ *G06K 9/4604* (2013.01); *G06T 3/00* (2013.01); *G06T 7/12* (2017.01); *G06T 2207/30261* (2013.01)

(56) References Cited

U.S. PATENT DOCUMENTS

| | | | |
|---|---|---|---|
| 6,172,601 | B1 | 1/2001 | Wada et al. |
| 6,392,218 | B1 | 5/2002 | Kuehnle |
| 6,411,898 | B2 | 6/2002 | Ishida et al. |
| 6,923,080 | B1 | 8/2005 | Dobler et al. |
| 6,999,620 | B1 | 2/2006 | Harville |
| 7,003,136 | B1 | 2/2006 | Harville |
| 7,190,282 | B2 | 3/2007 | Maemura et al. |
| 7,298,247 | B2 | 11/2007 | Shimizu |
| 7,365,653 | B2 | 4/2008 | Yang et al. |
| 7,860,340 | B2 | 12/2010 | Marugame et al. |
| 8,025,408 | B2 | 9/2011 | Sato et al. |
| 8,116,530 | B2 | 2/2012 | Miyazaki |
| 8,229,173 | B2 | 7/2012 | Kawakami |
| 8,285,010 | B2 | 10/2012 | Rowe |
| 8,503,713 | B2 | 8/2013 | Ziemeck et al. |
| 8,675,041 | B2 | 3/2014 | Kuboyama et al. |
| 9,100,554 | B2 | 8/2015 | Barth |
| 9,135,511 | B2* | 9/2015 | Hayakawa .......... G06K 9/00805 |
| 9,141,870 | B2* | 9/2015 | Fukata ................ G06K 9/00791 |
| 9,189,691 | B2* | 11/2015 | Fukata ................ H04N 7/18 |
| 9,239,960 | B2* | 1/2016 | Fukata .................. G08G 1/165 |
| 9,251,426 | B2* | 2/2016 | Hayakawa ............. G08G 1/166 |
| 9,349,057 | B2* | 5/2016 | Tsuchiya .................. B60R 1/00 |
| 9,349,059 | B2* | 5/2016 | Hayakawa ............. G08G 1/166 |
| 9,558,556 | B2* | 1/2017 | Fukata ................ G06K 9/00791 |
| 9,559,546 | B2* | 1/2017 | Claudepierre .......... H02J 5/005 |
| 9,569,675 | B2* | 2/2017 | Hayakawa ............. G08G 1/166 |
| 9,589,193 | B2* | 3/2017 | Fukata ................ G06K 9/00825 |
| 9,591,274 | B2* | 3/2017 | Hayakawa ................ B60R 1/00 |
| 9,726,883 | B2* | 8/2017 | Fukata .................. G08G 1/166 |
| 9,754,172 | B2* | 9/2017 | Hayakawa ................ B60R 1/00 |
| 9,783,127 | B2* | 10/2017 | Fukata ................ G06K 9/00791 |
| 9,804,386 | B2* | 10/2017 | Hayakawa ................ B60S 1/56 |
| 2002/0110262 | A1 | 8/2002 | Iida et al. |
| 2002/0126875 | A1 | 9/2002 | Naoi et al. |
| 2003/0197626 | A1 | 10/2003 | Endo et al. |
| 2004/0260469 | A1 | 12/2004 | Mizusawa |
| 2005/0206511 | A1 | 9/2005 | Heenan et al. |
| 2006/0177107 | A1 | 8/2006 | Ishii |
| 2006/0221417 | A1 | 10/2006 | Fujieda et al. |
| 2006/0228001 | A1 | 10/2006 | Tsukamoto |
| 2007/0085901 | A1 | 4/2007 | Yang et al. |
| 2007/0172141 | A1 | 7/2007 | Bando |
| 2007/0230785 | A1 | 10/2007 | Watanabe |
| 2007/0263902 | A1 | 11/2007 | Higuchi et al. |
| 2008/0008399 | A1 | 1/2008 | Marugame et al. |
| 2008/0043113 | A1 | 2/2008 | Ishii |
| 2008/0056534 | A1* | 3/2008 | Kigasawa ................. G06T 7/70 382/103 |
| 2008/0192984 | A1 | 8/2008 | Higuchi et al. |
| 2008/0205706 | A1* | 8/2008 | Hongo ...................... B60R 1/00 382/104 |
| 2008/0298642 | A1 | 12/2008 | Meenen |
| 2009/0092334 | A1 | 4/2009 | Shulman et al. |
| 2009/0122140 | A1 | 5/2009 | Imamura |
| 2009/0190800 | A1 | 7/2009 | Takahashi |
| 2009/0268027 | A1 | 10/2009 | Yang |
| 2010/0002078 | A1 | 1/2010 | Ito |
| 2010/0045788 | A1 | 2/2010 | Zhang et al. |
| 2010/0134593 | A1 | 6/2010 | Kakinami |
| 2010/0142771 | A1 | 6/2010 | Miura et al. |
| 2010/0149333 | A1 | 6/2010 | Yang |
| 2010/0215218 | A1 | 8/2010 | Takahashi |
| 2010/0220190 | A1 | 9/2010 | Hiroshi |
| 2010/0231718 | A1 | 9/2010 | Nakamori et al. |
| 2010/0303344 | A1 | 12/2010 | Sato et al. |
| 2010/0310137 | A1 | 12/2010 | Chou et al. |
| 2011/0026771 | A1 | 2/2011 | Hsu et al. |
| 2013/0322688 | A1 | 12/2013 | Tsuchiya et al. |

FOREIGN PATENT DOCUMENTS

| | | |
|---|---|---|
| EP | 1 962 254 A2 | 8/2008 |
| EP | 1 964 719 A2 | 9/2008 |
| JP | 4-163249 A | 6/1992 |
| JP | 07-280517 A | 10/1995 |
| JP | 09-081738 A | 3/1997 |
| JP | 2000-214256 A | 8/2000 |
| JP | 2005-225250 | 8/2005 |
| JP | 2005-276056 A | 10/2005 |
| JP | 2005-311666 A | 11/2005 |
| JP | 2006-268677 A | 10/2006 |
| JP | 2006-315482 A | 11/2006 |
| JP | 2006-339960 A | 12/2006 |
| JP | 2007-109166 A | 4/2007 |
| JP | 2007-129560 A | 5/2007 |
| JP | 2007-280132 A | 10/2007 |
| JP | 2007-300559 A | 11/2007 |
| JP | 2008-003941 A | 1/2008 |
| JP | 2008-159958 A | 7/2008 |
| JP | 2008 219063 A | 9/2008 |
| JP | 2008-227646 A | 9/2008 |
| JP | 2009-093332 A | 4/2009 |
| JP | 4284664 B2 | 6/2009 |
| JP | 2009-265783 A | 11/2009 |
| JP | 2009-266136 A | 11/2009 |
| JP | 2009-277021 A | 11/2009 |
| JP | 2010-081273 A | 4/2010 |
| JP | 2010-109451 A | 5/2010 |
| JP | 2010-128939 A | 6/2010 |
| JP | 2010-211701 A | 9/2010 |
| RU | 235480 C1 | 4/2009 |
| RU | 97092 U1 | 8/2010 |
| WO | WO-2010/004677 A1 | 1/2010 |

OTHER PUBLICATIONS

An English translation of the Japanese Office Action, Japanese patent application No. 2013-526867 dated Aug. 12, 2014.
European Extended Search Report, dated Sep. 1, 2014, 5 pages.
Russian Office Action, dated Jun. 2, 2014, 6 pages.
USPTO Office Action, U.S. Appl. No. 14/111,409, dated Jul. 21, 2016, 16 pages.
USPTO Office Action (2005/0147277, 2012/0133769, 2008/0205706, WO-2011/016367), U.S. Appl. No. 14/235,945, dated Jun. 17, 2016, 140 pages.
USPTO Notice of Allowance (2014/0146176, 2015/0016681, 2015/0054920, 2015/0186733, 2015/0195496, 2015/0323785, U.S. Pat. No. 7,317,474, U.S. Pat. No. 7,379,813, U.S. Pat. No. 8,994,520, U.S. Pat. No. 9,129,528, U.S. Pat. No. 9,286,800, U.S. Pat. No. 9,290,204), U.S. Appl. No. 14/235,132, dated Apr. 12, 2016, 421 pages.
USPTO Office Action, U.S. Appl. No. 14/235,945, dated Dec. 1, 2016, 16 pages.
Arata Takahashi et al., "Image processing technology for rear view camera(I): Development of lane detection system," Jun. 2003, R&D Review of Toyota CRDL vol. 38, No. 2.
Ruyi Jiang et al., "Low-Level Image Processing for Lane Detection and Tracking" In: "Lecture Notes of the Institute for Computer Sciences, Social Informatics and Telecommunications Engineering," Sep. 2009.
USPTO Office Action, U.S. Appl. No. 14/111,409, dated Nov. 15, 2017, 18 pages.
USPTO Notice of Allowance, U.S. Appl. No. 14/235,945, dated Mar. 28, 2017, 7 pages.
USPTO Office Action, U.S. Appl. No. 14/111,409, dated May 3, 2017, 13 pages.

* cited by examiner

THREE-DIMENSIONAL OBJECT DETECTION DEVICE AND THREE-DIMENSIONAL OBJECT DETECTION METHOD

TECHNICAL FIELD

The present invention relates to a three-dimensional object detection device and a three-dimensional object detection method.

BACKGROUND ART

Conventionally, there has been proposed a three-dimensional object detection device which detects horizontal edges or vertical edges in an actual space from a bird's eye view obtained by subjecting a captured image to viewpoint conversion to the bird's eye point of view, and then detects a three-dimensional object such as a vehicle by using the number of these edges. In this three-dimensional object detection device, the vertical edges in the actual space get projected and appear on the bird's eye view as a group of radial straight lines passing a viewpoint of a camera. On the basis of this knowledge, the three-dimensional object detection device detects the three-dimensional object by detecting the vertical edges and then using the amount of the vertical edges (see Patent Document 1).

PRIOR ART DOCUMENT

Patent Document

Patent Document 1: Japanese Patent Application Publication No. Hei 4-163249

SUMMARY OF INVENTION

Technical Problem

However, the three-dimensional object in the bird's eye view obtained by subjecting the captured image to viewpoint conversion to the bird's eye point of view is stretched depending on the height thereof. Accordingly, in the bird's eye view, an edge appearing at a high position of the three-dimensional object (an edge at a high position in the actual space) has a lower resolution than an edge at a low position of the three-dimensional object (an edge at a low position in the actual space). Meanwhile, the width of the edge at the low position of the three-dimensional object becomes smaller.

Hence, a problem occurs when the edges are detected by using a differential filter of three pixels by three pixels as in the technique described in Patent Document 1. Regarding an edge at a high position of a three-dimensional object, the edge, which is actually present, may not be detected because of its low resolution. Regarding an edge at a low position of the three-dimensional object, the edge may be determined as a noise and not be detected as an edge because of its small width. Due to these reasons, the three-dimensional object detection device described in Patent Document 1 has such a problem that detection accuracy of the three-dimensional object is deteriorated.

The present invention has been made to solve such a problem of the related art and an object thereof is to provide a three-dimensional object detection device and a three-dimensional object detection method capable of improving detection accuracy of a three-dimensional object.

Solution to Problem

To solve the above-mentioned problem, the present invention creates a bird's eye view image by performing viewpoint conversion processing on an image captured by image capturing device, then calculates, for each of a plurality of positions along a vertical imaginary line extending in a vertical direction in an actual space, a luminance difference between two pixels near the position, and detects a three-dimensional object on the basis of continuities of the calculated luminance differences of the respective positions.

Effects of the Invention

In the present invention, when the image of the predetermined area is looked down from the bird's eye point of view, the vertical imaginary line extending in the vertical direction in the actual space is set and the three-dimensional object is detected based on the continuities of the luminance differences along the vertical imaginary line. Specifically, in the present invention, when the luminance differences are high, the edge of the three-dimensional object is likely to exist in the portion with the high luminance difference. Thus, the three-dimensional object can be detected based on the continuous luminance differences. Particularly, since two pixels along the vertical imaginary line extending in the vertical direction in the actual space are compared with each other, the detection is not affected by a phenomenon in which the three-dimensional object is stretched depending on the height from a road surface, the phenomenon caused by the viewpoint conversion of converting the captured image to the bird's eye view image. Accordingly, in the present invention, the detection accuracy of the three-dimensional object can be improved.

DESCRIPTION OF EMBODIMENTS

Figure 1:
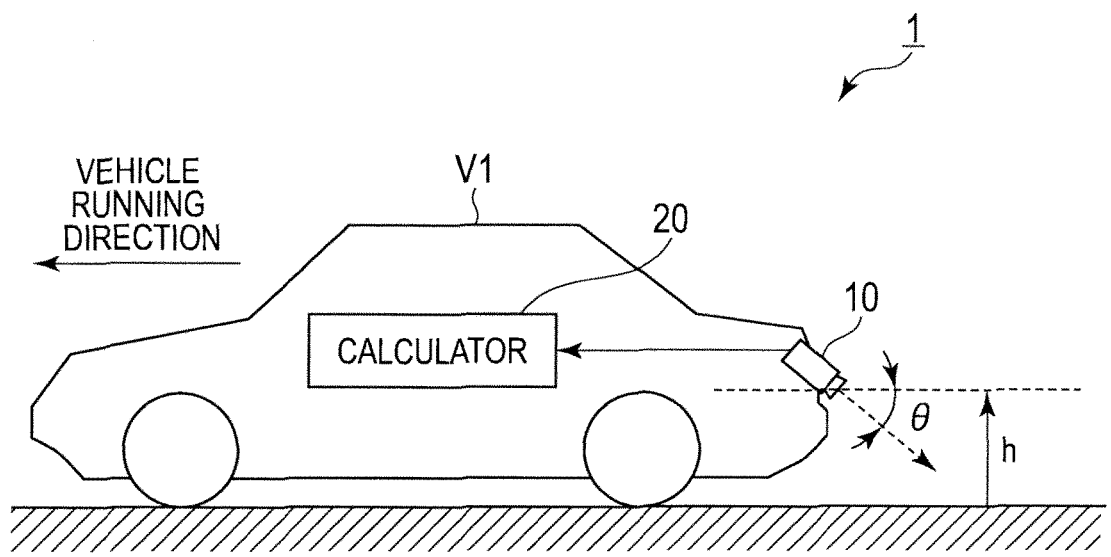
FIG. 1 is a schematic configuration diagram of a three-dimensional object detection device of an embodiment, which is a schematic block diagram showing an example where the three-dimensional detection device is mounted in a vehicle.

Embodiments of the present invention are described below based on the drawings. FIG. 1 is a schematic configuration diagram of a three-dimensional object detection device 1 of the embodiments. In the embodiments, examples are shown in which the three-dimensional object detection device 1 is mounted in a vehicle V1. As shown in FIG. 1, the three-dimensional object detection device 1 includes a camera (image capturing device) 10 and a calculator 20.

The camera 10 is attached to a rear end portion of the vehicle V1 at a position at height h. The camera 10 is attached in such a way that an optical axis thereof is inclined downward from the horizontal line by an angle θ. The camera 10 captures an image of a predetermined area from this attachment position. The camera 10 supplies the captured image to the calculator 20. The calculator 20 detects presence and absence of a three-dimensional object diagonally behind the vehicle V1 by using the image supplied from the camera 10.

Figure 2:
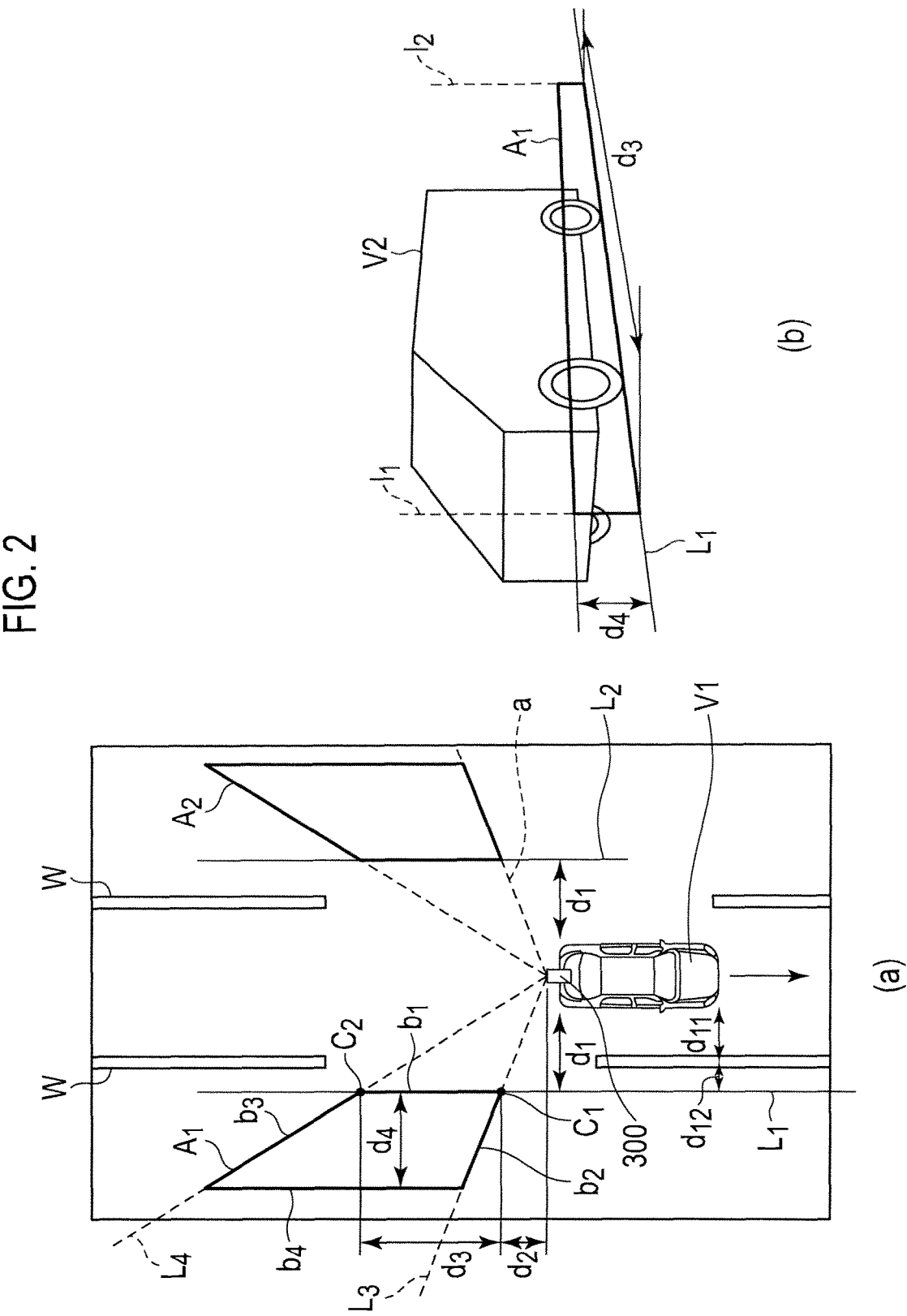
FIG. 2 is a view showing an image capturing area of a camera in a three-dimensional object detection device shown as a first embodiment, in which Part (a) is a top view showing a positional relationship among detection areas and the like, and Part (b) is a perspective view showing the positional relationship among the detection areas and the like in an actual space.

FIG. 2 is a view showing an image capturing range and the like of the camera 10 shown in FIG. 1. Part (a) of FIG. 2 shows a top view. Part (b) of FIG. 2 shows a perspective view of an actual space diagonally behind the vehicle V1. As shown in Part (a) of FIG. 2, the camera 10 has a predetermined angle-of-view a. The camera 10 captures an image of an area diagonally behind the vehicle V1 within the predetermined angle-of-view a. The angle-of-view a of the camera 10 is set in such a way that not only a lane in which the vehicle V1 is running but also lanes adjacent thereto are included in the image capturing range of the camera 10.

The calculator 20 executes various types of processing for portions in detection areas $A_1$, $A_2$ of the three-dimensional object to be detected, in the captured image captured by the camera 10. The calculator 20 thereby determines whether the three-dimensional object (particularly, another vehicle V2) exists in the detection areas $A_1$, $A_2$. The detection areas $A_1$, $A_2$ each have a trapezoidal shape in the top view. The position, size, and shape of each of the detection areas $A_1$, $A_2$ are determined based on distances $d_1$ to $d_4$.

The distance $d_1$ is a distance from the vehicle V1 to a ground contact line $L_1$ or $L_2$. The ground contact line $L_1$ or $L_2$ is a line where the three-dimensional object existing in the lane adjacent to the lane in which the vehicle V1 is running comes into contact with the ground surface. An object of the embodiment is to detect the other vehicle V2 and the like (including two-wheel vehicles and the like) which is located diagonally behind the vehicle V1 and is running in the adjacent lane on the left or right side to the lane of the vehicle V1. Accordingly, the distance $d_1$ which is the distance to the position of the ground contact line $L_1$ or $L_2$ of the other vehicle V2 can be substantially fixedly determined by a distance $d_{11}$ from the vehicle V1 to a white line W and a distance $d_{12}$ from the white line W to a position where the other vehicle V2 is expected to run.

The distance $d_1$ is not necessary fixedly determined and may be variable. In this case, the calculator 20 recognizes the position of the white line W relative to the vehicle V1 by using a technique of white line recognition and the like and determines the distance $d_{11}$ on the basis of the recognized position of the white line W. The distance $d_1$ is thus variably set by using the determined distance $d_{11}$.

In the embodiment, since the position where the other vehicle V2 runs (the distance $d_{12}$ from the white line W) and the position where the vehicle V1 runs (the distance $d_{11}$ from the white line W) are roughly constant, it is assumed that the distance $d_1$ is fixedly determined.

The distance $d_2$ is a distance in a vehicle running direction from the rear end portion of the vehicle V1. The distance $d_2$ is determined in such a way that at least the detection areas $A_1, A_2$ are included in the angle-of-view a of the camera 10. Particularly, in the embodiment, the distance $d_2$ is set in such a way that each of the detection areas $A_1, A_2$ abuts on an area defined by the angle-of-view a.

The distance $d_3$ is a distance showing the length of each of the detection areas $A_1, A_2$ in the vehicle running direction. The distance $d_3$ is determined based on the size of the three-dimensional object to be detected. In the embodiment, since the other vehicle V2 and the like are to be detected, the distance $d_3$ is set to a length in which the other vehicle V2 can be included.

As shown in Part (b) of FIG. 2, the distance $d_4$ is a distance indicating a height set to include tires of the other vehicle V2 and the like in the actual space. The distance $d_4$ is set to such a length as shown in Part (a) of FIG. 2 in a bird's eye view image. It is preferable that the distance $d_4$ be set to a length not including lanes (i.e., lanes which are two lanes away from the lane of the vehicle V1) adjacent to the right and left adjacent lanes in the bird's eye view image. This is due to the following reason. When the lanes which are two lanes away from the lane of the vehicle V1 are included, it is impossible to determine whether the other vehicle V2 is in the adjacent lane on the right or left side of the lane in which the vehicle V1 is running or the other vehicle V2 is in the lane which is two lanes away therefrom.

The distances $d_1$ to $d_4$ are determined as described above. The position, size, and shape of each of the detection areas $A_1, A_2$ are thus determined. To be specific, the position of an upper edge $b_1$ of each of detection areas $A_1, A_2$ having the trapezoidal shapes is determined from the distance $d_1$. A starting point position $C_1$ of the upper edge $b_1$ is determined from the distance $d_2$. An ending point position $C_2$ of the upper edge $b_1$ is determined from the distance $d_3$. A side edge $b_2$ of each of the detection areas $A_1, A_2$ having the trapezoidal shapes is determined from a straight line $L_3$ extending from the camera 10 toward the starting point position $C_1$. Similarly, a side edge $b_3$ of each of the detection areas $A_1, A_2$ having the trapezoidal shapes is determined from a straight line $L_4$ extending from the camera 10 toward the ending point position $C_2$. A lower edge $b_4$ of each of the detection areas $A_1, A_2$ having the trapezoidal shapes is determined from the distance $d_4$. The areas surrounded by the edges $b_1$ to $b_4$ are referred to as the detection areas $A_1, A_2$. As shown in Part (b) of FIG. 2, the detection areas $A_1, A_2$ have square shapes (rectangular shapes) in the actual space diagonally behind the vehicle V1.

In the embodiment, the detection areas $A_1, A_2$ have the trapezoidal shapes in the bird's eye point of view. However, the detection areas $A_1, A_2$ are not limited to the foregoing and may have other shapes such as square shapes in the bird's eye point of view.

Figure 3:
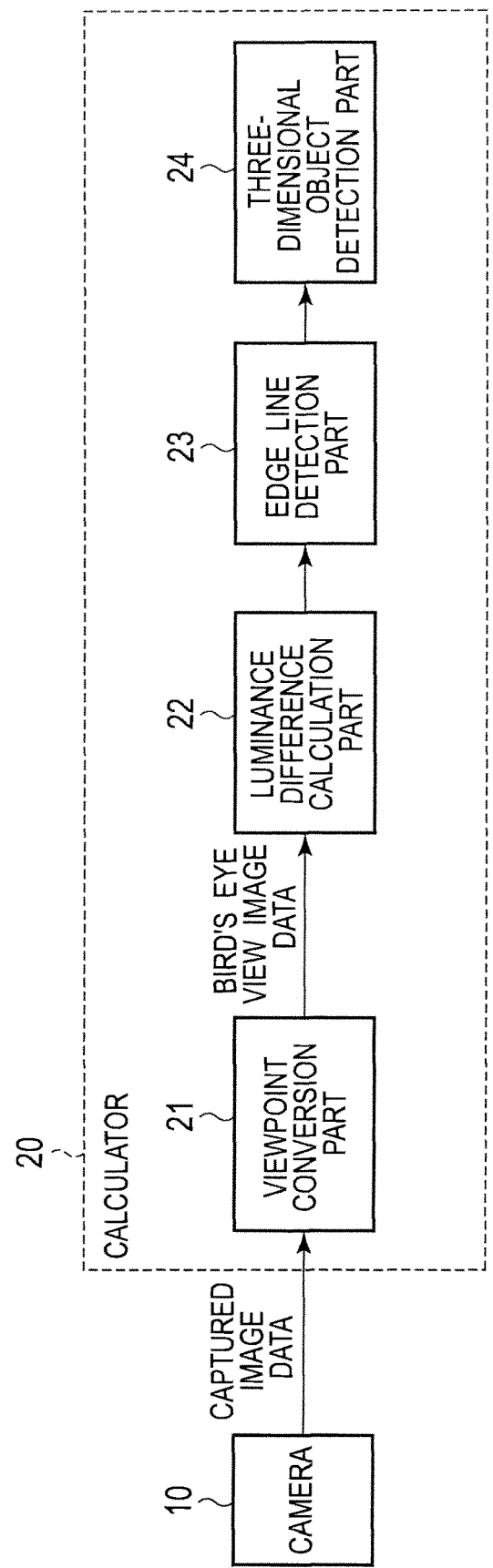
FIG. 3 is a block diagram showing a functional configuration of the three-dimensional object detection device shown as the first embodiment.

FIG. 3 is a block diagram showing details of the calculator 20 shown in FIG. 1. In FIG. 3, the camera 10 is also illustrated to clarify a connection relationship.

As shown in FIG. 3, the calculator 20 includes a viewpoint conversion part (viewpoint conversion unit) 21, a luminance difference calculation part (luminance difference calculator) 22, an edge line detection part (edge line detection means) 23, and a three-dimensional object detection part (three-dimensional object detector) 24. The calculator 20 is a computer including a CPU, a RAM, a ROM, and the like. The calculator 20 implements functions of the viewpoint conversion part 21, the luminance difference calculation part 22, the edge line detection part 23, and the three-dimensional object detection part 24 by performing image processing and like according to a preset program.

The viewpoint conversion part 21 receives captured image data of the predetermined area which is obtained by image capturing with the camera 10. The viewpoint conversion part 21 performs viewpoint conversion processing on the received captured image data in which the captured image data is converted to bird's eye view image data in a state of bird's eye view. The state of bird's eye view image is a state where an image is obtained as if from a viewpoint of a virtual camera looking the vehicle vertically downward (or slightly obliquely downward) from above, for example. The viewpoint conversion processing is realized by the technique described in Japanese Patent Application Publication No. 2008-219063 for example.

The luminance difference calculation part 22 calculates a luminance difference in the bird's eye view image data subjected to the viewpoint conversion by the viewpoint conversion part 21 to detect an edge of the three-dimensional object included in the bird's eye view image. The luminance difference calculation part 22 calculates, for each of multiple positions along a vertical imaginary line extending in the vertical direction in the actual space, the luminance difference between two pixels near the position.

The luminance difference calculation part 22 calculates the luminance difference by using any one of a method of setting one vertical imaginary line extending in the vertical direction in the actual space and a method of setting two vertical imaginary lines.

Description is given of a specific method of setting two vertical imaginary lines. In terms of the bird's eye view image subjected to the viewpoint conversion, the luminance difference calculation part 22 sets a first vertical imaginary line which corresponds to a line segment extending in the vertical direction in the actual space, and a second vertical imaginary line which is different from the first vertical imaginary line and which corresponds to a line segment extending in the vertical direction in the actual space. The luminance difference calculation part 22 obtains the luminance difference between points on the first vertical imaginary line and points on the second vertical imaginary line, continuously along the first vertical imaginary line and the second vertical imaginary line. This operation of the luminance difference calculation part 22 is described below in detail.

Figure 4:
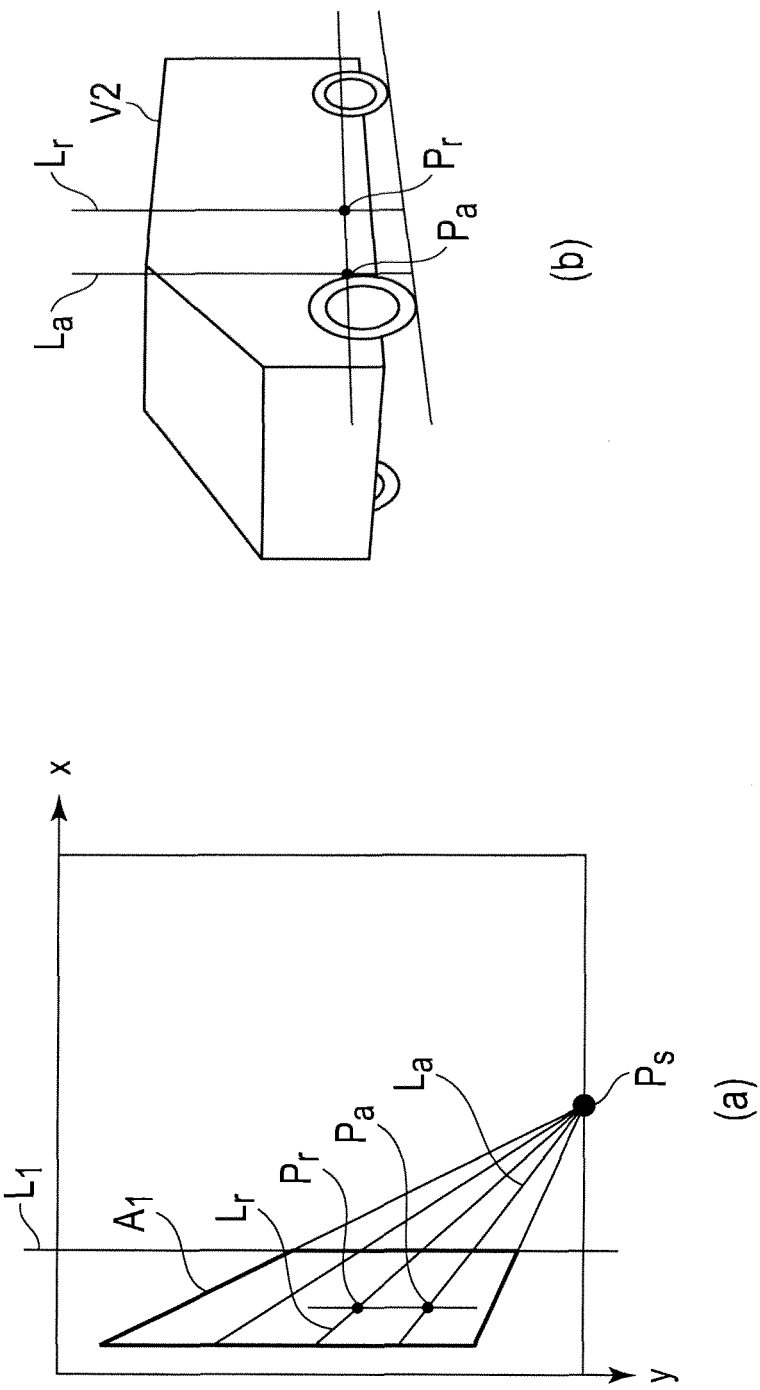
FIG. 4 is a view showing operations of a luminance difference calculation part in the three-dimensional object detection device shown as the first embodiment, in which Part (a) is a view showing a positional relationship among an attention line, a reference line, an attention point, and a reference point in a bird's eye view image, and Part (b) is a view showing a positional relationship among the attention line, the reference line, the attention point, and the reference point in the actual space.

As shown in Part (a) of FIG. 4, the luminance difference calculation part 22 sets the first vertical imaginary line $L_a$ (hereafter referred to as attention line $L_a$) which corresponds to the line segment extending in the vertical direction in the actual space and which passes through the detection area $A_1$. The luminance difference calculation part 22 sets the second vertical imaginary line $L_r$ (hereafter referred to as reference line $L_r$) which is different from the attention line $L_a$ and corresponds to the line segment extending in the vertical direction in the actual space and which passes through the detection area $A_1$. The reference line $L_r$ is set at a position away from the attention line $L_a$ by a predetermined distance in the actual space. The lines corresponding to the line segments extending in the vertical direction in the actual space are lines radially extending from a position $P_s$ of the camera 10 in the bird's eye view image.

The luminance difference calculation part 22 sets an attention point $P_a$ on the attention line $L_a$ (point on the first vertical imaginary line). The luminance difference calculation part 22 sets a reference point $P_r$ on the reference line $L_r$ (point on the second vertical imaginary line).

A relationship among the attention line $L_a$, the attention point $P_a$, the reference line $L_r$, and the reference point $P_r$ in the actual space is as shown in Part (b) of FIG. 4. As is apparent from Part (b) of FIG. 4, the attention line $L_a$ and the reference line $L_r$ extend in the vertical direction in the actual space. The attention point $P_a$ and the reference point $P_r$ are set at almost the same height in the actual space. There is no need to set the attention point $P_a$ and the reference point $P_r$ precisely at the same height and there is naturally an allowance to the extent that the attention point $P_a$ and the reference point $P_r$ are deemed to be substantially at the same height.

The luminance difference calculation part 22 obtains the luminance difference between the attention point $P_a$ and the reference point $P_r$. When the luminance difference between the attention point $P_a$ and the reference point $P_r$ is large, an edge probably exists between the attention point $P_a$ and the reference point $P_r$. Hence, the edge line detection part 23 shown in FIG. 3 detects an edge line on the basis of the luminance difference between the attention point $P_a$ and the reference point $P_r$.

Figure 5:
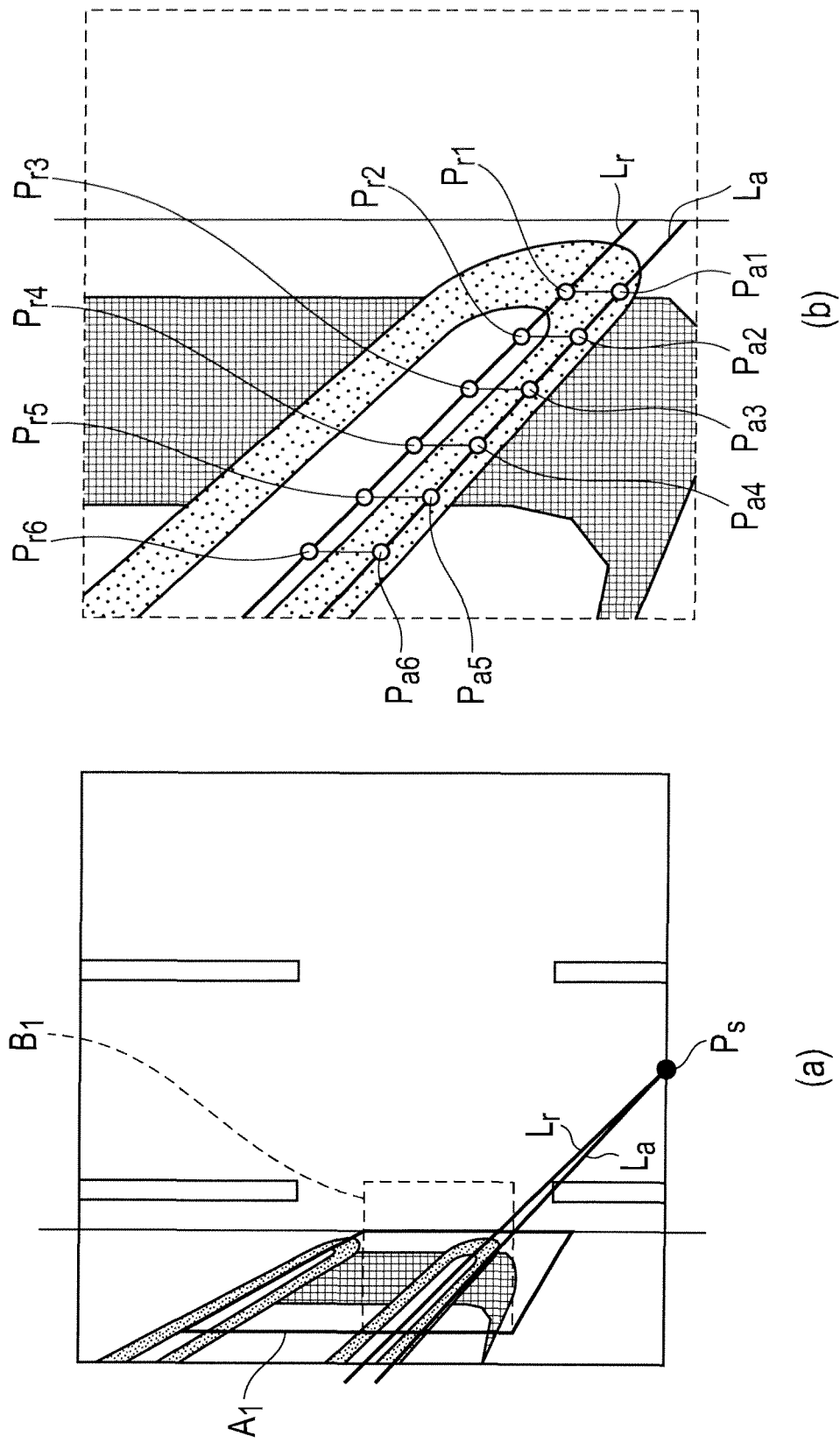
FIG. 5 is a view showing detailed operations of the luminance difference calculation part in the three-dimensional object detection device shown as the first embodiment, in which Part (a) shows the detection area in the bird's eye view image, and Part (b) is a view showing the positional relationship among the attention line, the reference line, the attention points, and the reference points in the bird's eye view image.

This operation is described in further detail. FIG. 5 is a second view showing the detailed operation of the luminance difference calculation part 22 shown in FIG. 3. Part (a) of FIG. 5 shows the bird's eye view image taken from the bird's eye point of view and Part (b) shows a partially enlarged view of the bird's eye view image shown in Part (a) of FIG. 5. Although only the detection area $A_1$ is illustrated in FIG. 5, the luminance difference can be similarly calculated for the detection area $A_2$.

When the other vehicle V2 is included in the captured image captured by the camera 10, the other vehicle V2 appears in the detection area $A_1$ in the bird's eye view image as shown in Part (a) of FIG. 5. Assume that the attention line $L_a$ is set on a rubber portion of the tire of the other vehicle V2 in the bird's eye view image as shown in Part (b) of FIG. 5 which is an enlarged view of a region B1 in Part (a) of FIG. 5.

In this state, the luminance difference calculation part 22 first sets the reference line $L_r$. The reference line $L_r$ is set in the vertical direction at a position away from the attention line $L_a$ by a predetermined distance in the actual space. Specifically, in the three-dimensional object detection device 1 of the embodiment, the reference line $L_r$ is set at a position away from the attention line $L_a$ by 10 cm in the actual space. Accordingly, on the bird's eye view image, the reference line $L_r$ is set, for example, on a wheel of the tire of the other vehicle V2 which is 10 cm away from the rubber portion of the tire of the other vehicle V2.

Next, the luminance difference calculation part 22 sets multiple attention points $P_{a1}$ to $P_{aN}$ on the attention line $L_a$. For example, in Part (b) of FIG. 5, six attention points $P_{a1}$ to $P_{a6}$ (regarding an arbitrary attention point, the point is hereinafter simply referred to as attention point $P_{ai}$) are set for the convenience of description. The number of the attention points $P_a$ set on the attention line $L_a$ can be any number. In the description below, description is given under the assumption that N attention points $P_a$ are set on the attention line $L_a$.

Subsequently, the luminance difference calculation part 22 sets reference points $P_{r1}$ to $P_{rN}$ in such a way that the reference points $P_{r1}$ to $P_{rN}$ and the attention points $P_{a1}$ to $P_{aN}$ are located respectively at the same heights in the actual space.

Then, the luminance difference calculation part 22 calculates the luminance difference between the attention points $P_a$ and the reference points $P_r$ located at the same height. The luminance difference calculation part 22 thereby calculates the luminance difference between two pixels for each of the multiple positions (1 to N) along the vertical imaginary line extending in the vertical direction in the actual space. For example, the luminance difference calculation part 22 calculates the luminance difference between the first attention point $P_{a1}$ and the first reference point $P_{r1}$ and calculates the luminance difference between the second attention point $P_{a2}$ and the second reference point $P_{r2}$. The luminance difference calculation part 22 thereby continuously obtains the luminance differences along the attention line $L_a$ and the reference line $L_r$. The luminance difference calculation part 22 then sequentially obtains the luminance differences between the third to N-th attention points $P_{a3}$ to $P_{aN}$ and the third to N-th reference points $P_{r3}$ to $P_{rN}$.

The luminance difference calculation part 22 moves the attention line $L_a$ in the detection area $A_1$ and repeatedly executes the processing such as setting of the reference line $L_r$, setting of the attention points $P_a$ and the reference points $P_r$, and calculation of the luminance differences. Specifically, the luminance difference calculation part 22 changes the respective positions of the attention line $L_a$ and the reference line $L_r$ by the same distance in the extending direction of the ground contact line in the actual space, and repeatedly executes the processing described above. For example, the luminance difference calculation part 22 sets a line having been set as the reference line $L_r$ in the previous processing newly as the attention line $L_a$, sets the new reference line $L_r$ for the new attention line $L_a$, and then sequentially obtains the luminance differences.

Referring to FIG. 3 again, the edge line detection part 23 detects the edge line from continuous luminance differences calculated by the luminance difference calculation part 22. For example, in the case shown in Part (b) of FIG. 5, since the first attention point $P_{a1}$ and the first reference point $P_{r1}$ are both located in the same tire portion, the luminance difference therebetween is small. Meanwhile, the second to sixth attention points $P_{a2}$ to $P_{a6}$ are located in the rubber portion of the tire while the second to sixth reference points $P_{r2}$ to $P_{r6}$ are located in the wheel portion of the tire. Accordingly, the luminance differences between the second to sixth attention points $P_{a2}$ to $P_{a6}$ and the second to sixth reference points $P_{r2}$ to $P_{r6}$ are large. The edge line detection part 23 can thereby detect the existence of the edge line between the second to sixth attention points $P_{a2}$ to $P_{a6}$ and the second to sixth reference points $P_{r2}$ to $P_{r6}$ which have the large luminance differences therebetween.

Specifically, when detecting the edge line, the edge line detection part 23 first adds an attribute to the i-th attention point $P_{ai}$ from the luminance difference between the i-th attention point $P_{ai}$ (coordinates xi, yi)) and the i-th reference point $P_{ri}$ (coordinates (xi', yi')), in accordance with Formula (1) shown below.

[Formula 1]

$$s(xi,yi)=1$$

(When $I(xi, yi) > I(xi', yi')+t$ is satisfied)

$$s(xi,yi)=-1$$

(When $I(xi, yi) < I(xi', yi')-t$ is satisfied)

$$s(xi,yi)=0 \quad (1)$$

(In cases other than those described above)

In Formula (1) shown above, t represents a threshold. I(xi, yi) represents a luminance value of the i-th attention point $P_{ai}$. I(xi', yi') represents a luminance value of the i-th reference point $P_{ri}$. In Formula (1) shown above, when the luminance value of the attention point $P_{ai}$ is higher than a luminance value obtained by adding the threshold t to the luminance value of the reference point $P_{ri}$, the attribute s(xi, yi) of the attention point $P_{ai}$ is "1". Meanwhile, when the luminance value of the attention point $P_{ai}$ is lower than a luminance value obtained by subtracting the threshold t from the luminance value of the reference point $P_{ri}$, the attribute s(xi, yi) of the attention point $P_{ai}$ is "−1". When the relationship between the luminance value of the attention point $P_{ai}$ and the luminance value of the reference point $P_{ri}$ is other than those described above, the attribute s(xi, yi) of the attention point $P_{ai}$ is "0".

Next, the edge line detection part 23 determines whether the attention line $L_a$ is the edge line from a continuity c(xi, yi) of the attributes s along the attention line $L_a$, on the basis of Formula (2) shown below.

[Formula 2]

c(xi,yi)=1

(When s(xi, yi)=s(xi+1, yi+1) is satisfied, excluding the case of 0=0)

$$c(xi,yi)=0 \quad (2)$$

(In cases other than that described above)

When the attribute s(xi, yi) of the attention point $P_{ai}$ and the attribute s(xi+1, yi+1) of the attention point $P_{ai+1}$ adjacent thereto coincide with each other, the continuity c(xi, yi) is "1". When the attribute s(xi, yi) of the attention point $P_{ai}$ and the attribute s(xi+1, yi+1) of the attention point $P_{ai+1}$ adjacent thereto do not coincide with each other, the continuity c(xi, yi) is "0".

Subsequently, the edge line detection part 23 obtains the sum of the continuities c(xi, yi) of all of the attention points $P_a$ on the attention line $L_a$. The edge line detection part 23 then normalizes the continuities c by dividing the obtained sum of the continuities c by the number N of the attention points $P_a$. The edge line detection part 23 determines that the attention line $L_a$ is the edge line when the normalized value exceeds a threshold θ. The threshold θ is a value preset based on an experiment and the like.

Specifically, the edge line detection part 23 determines whether the attention line $L_a$ is the edge line on the basis of Formula (3) shown below.

[Formula 3]

$$\Sigma c(xi,yi)/N > \theta \quad (3)$$

The edge line detection part 23 then performs determination of the edge line for all of the attention lines $L_a$ drawn in the detection area $A_1$.

Referring to FIG. 3 again, the three-dimensional object detection part 24 detects the three-dimensional object on the basis of an amount of the edge lines detected by the edge line detection part 23. As described above, the three-dimensional object detection device 1 of the embodiment detects the edge line extending in the vertical direction in the actual space. Detection of many edge lines extending in the vertical detection means that the three-dimensional object is likely to exist in the detection area $A_1$ or $A_2$. The three-dimensional object detection part 24 thus detects the three-dimensional object on the basis of the quantity of the edge lines detected by the edge line detection part 23.

Furthermore, before performing the detection of three-dimensional object, the three-dimensional object detection part 24 determines whether each of the edge lines detected by the edge line detection part 23 is a proper edge line. The three-dimensional object detection part 24 determines whether a luminance change along the edge line in the bird's eye view image on the edge line is larger than a predetermined threshold. When the luminance change in the bird's eye view image on the edge line is larger than the threshold, the edge line is determined to be detected by erroneous determination. Meanwhile, when the luminance change in the bird's eye view image on the edge line is not larger than the threshold, the edge line is determined to be a proper edge line. The threshold is a value preset based on an experiment and the like.

Figure 6:
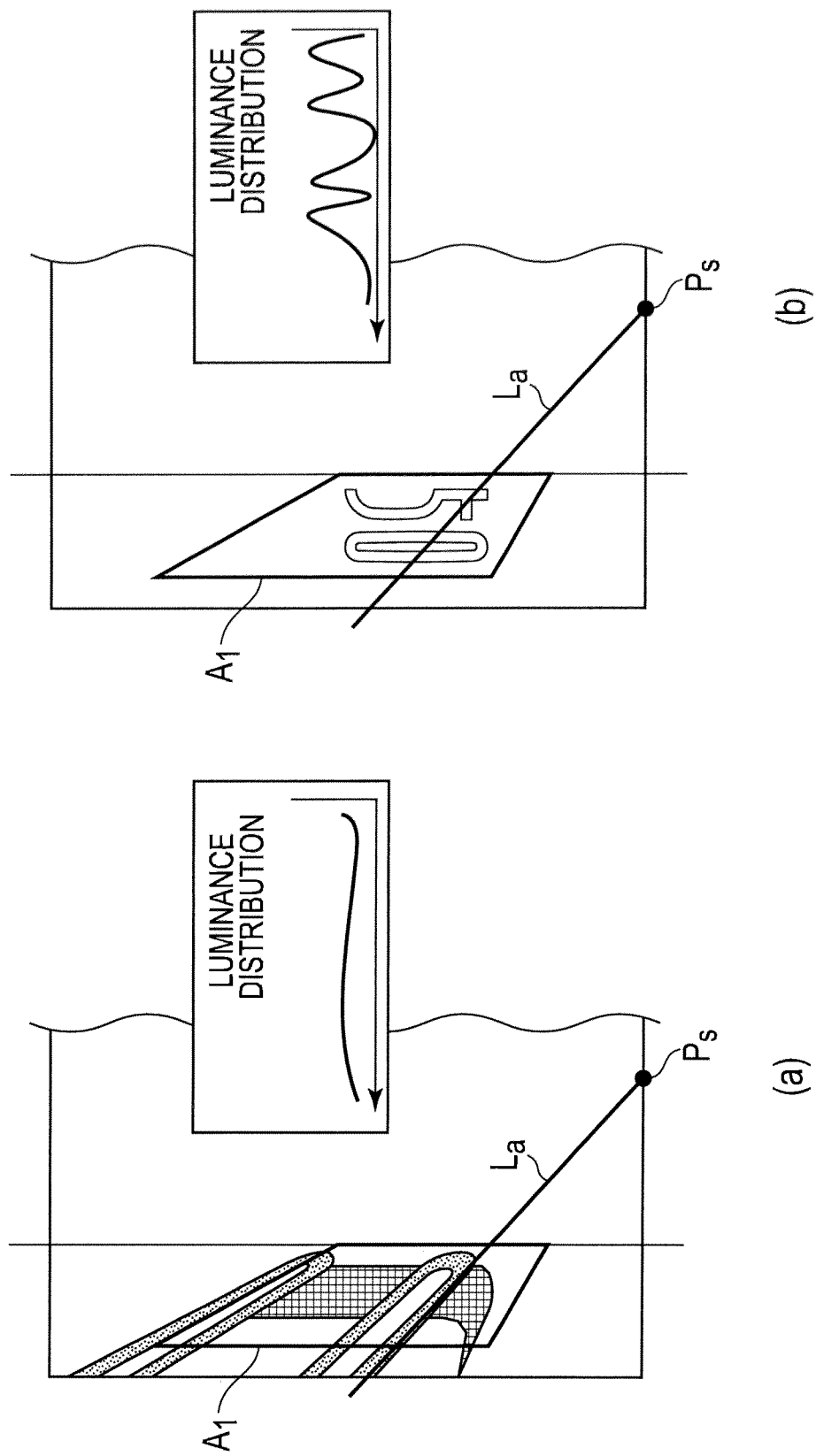
FIG. 6 is a view showing edge lines and luminance distribution on each of the edge lines, in which Part (a) shows the edge line and the luminance distribution on the edge line in the case where a three-dimensional object (vehicle) exists in the detection area, and Part (b) shows the edge line and the luminance distribution on the edge line in the case where no three-dimensional object exists in the detection area.

FIG. 6 is a view showing luminance distribution and the edge lines. Part (a) of FIG. 6 shows the edge line and the luminance distribution in the case where the other vehicle V2 as the three-dimensional object exists in the detection area $A_1$. Part (b) of FIG. 6 shows the edge line and the luminance distribution in the case where no three-dimensional object exists in the detection area $A_1$.

Assume that the attention line $L_a$ set in the tire rubber portion of the other vehicle V2 is determined to be the edge line in the bird's eye view image as shown in Part (a) of FIG. 6. In this case, the luminance change in the bird's eye view image on the attention line $L_a$ is moderate. This is because the image captured by the camera 10 is subjected to the viewpoint conversion to the bird's eye view image (bird's eye point of view) and the tire of the other vehicle V2 is thereby stretched in the bird's eye view image.

Meanwhile, assume that the attention line $L_a$ set in a white character portion of "50" which is drawn on the road surface is erroneously determined as an edge line in the bird's eye view image as shown in Part (b) of FIG. 6. In this case, the luminance change in the bird's eye view image on the attention line $L_a$ largely fluctuates. This is because portions with high luminance corresponding to the white character portion and portions with low luminance corresponding to the road surface and the like are mixed on the edge line.

The edge line detection part 23 determines whether the edge line is detected by erroneous determination, on the basis of the above-described difference in the luminance distribution on the attention line $L_a$. When the luminance change along the edge line is larger than the predetermined threshold, the three-dimensional object detection part 24 determines that the edge line is detected by erroneous determination. Then, the edge line is not used for the detection of the three-dimensional object. This suppresses occurrence of the case where white characters such as "50" on the road surface, roadside weeds, and the like are determined as the edge line and the detection accuracy of the three-dimensional object is thereby reduced.

Specifically, the three-dimensional object detection part 24 calculates the luminance change of the edge line by using any one of Formulae (4) and (5) shown below. The luminance change of the edge line corresponds to an evaluation value in the vertical direction in the actual space. In Formula (4) shown below, the luminance distribution is evaluated by using a total value of squares of differences, each of which is a difference between the i-th luminance value I(xi, yi) and the i+1-th luminance value I(xi+1, yi+1) adjacent thereto on the attention line $L_a$. In Formula (5) shown below, the luminance distribution is evaluated by using a total value of absolute values of differences, each of which is the difference between the i-th luminance value I(xi, yi) and the i+1-th luminance value I(xi+1, yi+1) adjacent thereto on the attention line $L_a$.

[Formula 4]

$$(\text{The evaluation value in the direction corresponding to verticality}) = \Sigma\{\{I(xi,yi)-I(xi+1,yi+1)\}^2\} \quad (4)$$

[Formula 5]

$$(\text{The evaluation value in the direction corresponding to verticality}) = \Sigma|I(xi,yi)-I(xi+1,yi+1)| \quad (5)$$

The calculation is not limited only to the one using Formula (5) and may also be performed as follows. As shown in Formula (6) below, the attribute b of the adjacent luminance values may be binarized by using a threshold t2 and the binarized attributes b for all of the attention points $P_a$ may be summed up.

[Formula 6]

$$\text{(The evaluation value in the direction corresponding to verticality)} = \Sigma b(xi, yi) \quad (6)$$

where, b(xi, yi)=1
(when |I(xi, yi)−I(xi+1, yi+1)|>t2)
b(xi, yi)=0
(in cases other than that described above)

When the absolute value of the luminance difference between the luminance value of the attention point $P_{ai}$ and the luminance value of the reference point $P_{ri}$ is larger than the threshold t2, the attribute b of the attention point $P_{ai}$ (xi, yi) is "1". When the relation between the absolute value and the threshold t2 is other than that, the attribute b(xi, yi) of the attention point $P_{ai}$ is "0". The threshold t2 is preset based on an experiment and the like to determine that the attention line $L_a$ does not lie on the same one three-dimensional object. The three-dimensional object detection part 24 then sums up the attributes b for all of the attention points $P_a$ on the attention line $L_a$, obtains the evaluation value in the direction corresponding to verticality, and determines whether the edge line is a proper edge line.

Figure 7:
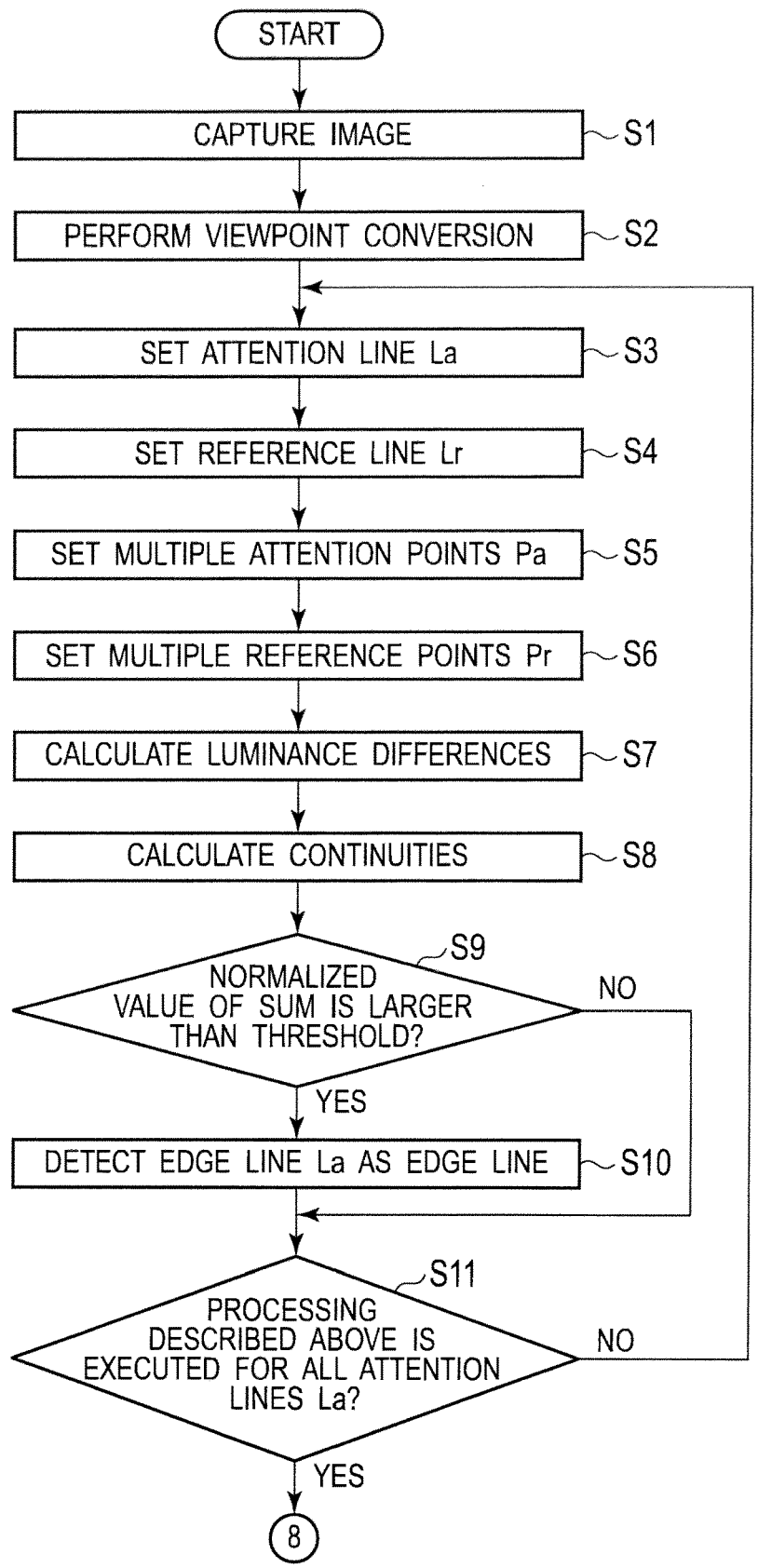
FIG. 7 is a flowchart showing operation procedures performed by the three-dimensional object detection device shown as the first embodiment.
Figure 8:
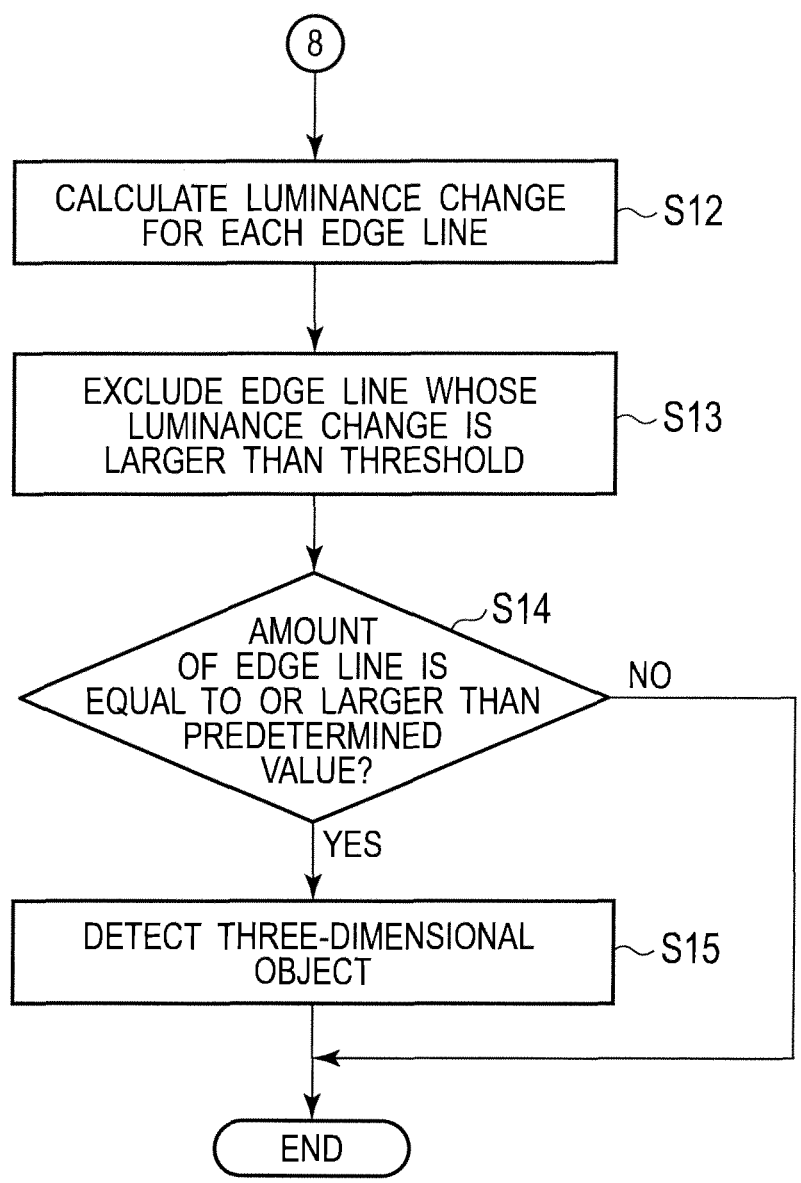
FIG. 8 is a flowchart showing operation procedures performed by the three-dimensional object detection device shown as the first embodiment.

Next, a three-dimensional object detection method of the embodiment is described. FIGS. 7 and 8 are flowcharts showing details of the three-dimensional object detection method of the embodiment. In FIGS. 7 and 8, description is given of processing for the detection area $A_1$, for the sake of convenience. However, similar processing can be performed for the detection area $A_2$ as well.

As shown in FIG. 7, first in step S1, the camera 10 captures the image of the predetermined area defined by the angle-of-view a and the attachment position.

Next, in step S2, the luminance difference calculation part 22 receives the captured image data captured by the camera 10 in step S1 and generates the bird's eye view image data by performing the viewpoint conversion.

Then, in step S3, the luminance difference calculation part 22 sets the attention line $L_a$ in the detection area $A_1$. At this time, the luminance difference calculation part 22 sets a line corresponding to a line extending in the vertical direction in the actual space as the attention line $L_a$.

Subsequently, in step S4, the luminance difference calculation part 22 sets the reference line $L_r$ in the detection area $A_1$. At this time, the luminance difference calculation part 22 sets a line which corresponds to a line segment extending in the vertical direction in the actual space and which is away from the attention line $L_a$ by the predetermined distance in the actual space as the reference line $L_r$.

Next, in step S5, the luminance difference calculation part 22 sets multiple attention points $P_a$ on the attention line $L_a$. At this time, the luminance difference calculation part 22 sets the appropriate number of the attention points $P_a$ such that no problem occurs in the edge determination by the edge line detection part 23.

Moreover, in step S6, the luminance difference calculation part 22 sets the references points $P_r$ in such a way that each of the attention points $P_a$ and a corresponding one of the reference points $P_r$ are set at almost the same height in the actual space. Each attention point $P_a$ and the corresponding reference point $P_r$ are thus arranged in an almost horizontal direction. This facilitates the detection of the edge line extending in the vertical direction in the actual space.

Next, in step S7, the luminance difference calculation part 22 calculates the luminance difference between each attention point $P_a$ and the corresponding reference point $P_r$ which are at the same height in the actual space.

The edge line detection part 23 then calculates the attribute s of each attention point $P_a$ in accordance with Formula (1) shown above. Subsequently, in step S8, the edge line detection part 23 calculates the continuities c of the attributes s of the attention points $P_a$ in accordance with Formula (2) shown above.

Next, in step S9, the edge line detection part 23 determines whether the value obtained by normalizing the sum of the continuities c is larger than the threshold θ, in accordance with Formula (3) shown above. When the normalized value is determined to be larger than the threshold θ (S9: YES), the edge line detection part 23 detects the attention line $L_a$ as the edge line in step S10. Thereafter, the processing proceeds to step S11. When the normalized value is determined to be not larger than the threshold θ (S9: NO), the edge line detection part 23 does not detect the attention line $L_a$ as the edge line and the processing proceeds to step S11.

In step S11, the calculator 20 determines whether the processing of steps S3 to S10 described above is executed for all of the attention lines $L_a$ which can be set in the detection area $A_1$. When the calculator 20 determines that the processing is not executed for all of the attention lines $L_a$ (S11: NO), the processing is returned to step S3 and a new attention line $L_a$ is set. The processing to step S11 is then repeated. Meanwhile, when the calculator 20 determines that the processing is executed for all of the attention lines $L_a$ (S11: YES), the processing proceeds to step S12 of FIG. 8.

In step S12 of FIG. 8, the three-dimensional object detection part 24 calculates the luminance change along each of the edge lines detected in step S10 of FIG. 7. The three-dimensional object detection part 24 calculates the luminance change of the edge line in accordance with any one of Formulae (4), (5), and (6) shown above.

Next, in step S13, the three-dimensional object detection part 24 excludes, among the edge lines, an edge line whose luminance change is larger than the predetermined threshold. Specifically, the three-dimensional object detection part 24 determines that the edge line having the large luminance change is not a proper edge line and does not use the edge line for the detection of three-dimensional object. As described above, this is to prevent characters on the road surface, roadside weeds, and the like which are included in the detection area $A_1$ from being detected as the edge line. Accordingly, the predetermined value is a value obtained from an experiment and the like in advance and set based on the luminance changes which occur due to characters on the road surface, roadside weeds, and the like.

Subsequently, in step S14, the three-dimensional object detection part 24 determines whether the quantity of edge lines is equal to or larger than a predetermined value. The predetermined value described above is a value obtained from an experiment and the like and set in advance. For example, when a four-wheel vehicle is set as the three-dimensional object to be detected, the predetermined value is set based on the number of the edge lines of the four-wheel vehicle appeared in the detection area $A_1$ in the experiment and the like performed in advance.

When the quantity of edge lines is determined to be equal to or larger than the predetermined value (S14: YES), the three-dimensional object detection part 24 detects the existence of the three-dimensional object in the detection area $A_1$ in step S15. Meanwhile, when the quantity of edge lines is determined to be not equal to or larger than the predetermined value (S14: NO), the three-dimensional object detection part 24 determines that no three-dimensional object exists in the detection area $A_1$. Thereafter, the processing shown in FIGS. 7 and 8 is terminated.

As described above, in the three-dimensional object detection device 1 of the embodiment, the vertical imaginary lines which are the line segments extending in the vertical direction in the actual space are set in the bird's eye view image in order to detect the three-dimensional object existing in the detection area $A_1$ or $A_2$. Then, the three-dimensional object detection device 1 can calculate, for each of the multiple positions along the vertical imaginary lines, the luminance difference between two pixels near the position and determine the presence and absence of the three-dimensional objects on the basis of the continuities of the luminance differences.

Specifically, the three-dimensional object detection device 1 sets the attention line $L_a$ which corresponds to the line segment extending in the vertical direction in the actual space and the reference line $L_r$ which is different from the attention line $L_a$, for each of the detection areas $A_1$, $A_2$ in the bird's eye view image. The three-dimensional object detection device 1 continuously obtains the luminance differences between the attention points $P_a$ on the attention line $L_a$ and the reference points $P_r$ on the reference line $L_r$, along the attention line $L_a$ and the reference line $L_r$. The luminance difference between the attention line $L_a$ and the reference line $L_r$ is obtained by continuously obtaining the luminance differences between the points as described above. When the luminance difference between the attention line $L_a$ and the reference line $L_r$ is high, the edge of the three-dimensional object is likely to exist in a portion where the attention line $L_a$ is set. The three-dimensional object detection device 1 can thus detect the three-dimensional object on the basis of the continuous luminance differences. Particularly, since the luminance comparison between the vertical imaginary lines extending in the vertical direction in the actual space is performed, the detection processing of the three-dimensional object is not affected even when the three-dimensional object is stretched depending on the height from the road surface due to conversion to the bird's eye view image. Accordingly, in the three-dimensional object detection device 1, the detection accuracy of the three-dimensional object can be improved.

Moreover, in the three-dimensional object detection device 1, the luminance difference between two points at the same height near the vertical imaginary line is obtained. Specifically, the luminance difference is obtained from each attention point $P_a$ on the attention line $L_a$ and the corresponding reference point $P_r$ on the reference line $L_r$ which are at the same height in the actual space. Accordingly, the three-dimensional object detection device 1 can clearly detect the luminance difference in the case where the edge extending in the vertical direction exists.

Furthermore, the three-dimensional object detection device 1 adds the attribute to each attention point Pa on the attention line $L_a$ on the basis of the luminance difference between the attention point Pa and the corresponding reference point $P_r$ on the reference line $L_r$, and determines whether the attention line $L_a$ is the edge line on the basis of the continuities c of the attributes along the attention line $L_a$. Accordingly, the three-dimensional object detection device 1 can detect a boundary between a region with high luminance and a region with low luminance as the edge line and perform edge detection close to natural human senses.

Figure 9:
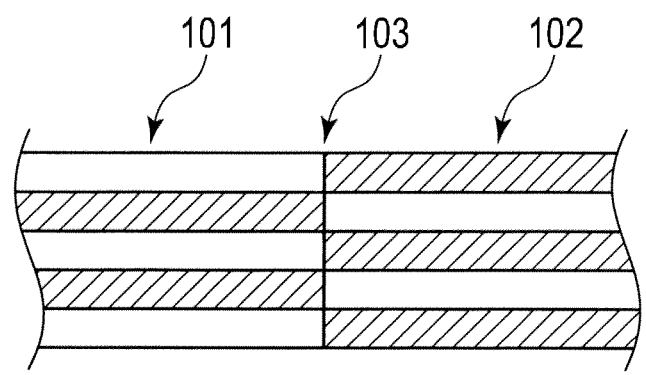
FIG. 9 is a view showing an image example for explaining an edge detection operation in the three-dimensional object detection device shown as the first embodiment.

This effect is described in detail. FIG. 9 is a view showing an image example for explaining processing of the edge line detection part 23 shown in FIG. 3. In this image example, a first stripe pattern 101 having a stripe pattern in which regions with high luminance and regions with low luminance are alternated and a second stripe pattern 102 having a stripe pattern in which regions with low luminance and regions with high luminance are alternated are adjacent to each other. Moreover, in this image example, the regions with high luminance in the first stripe pattern 101 and the regions with low luminance in the second stripe pattern 102 are adjacent to one another while the regions with low luminance in the first stripe pattern 101 and the regions with high luminance in the second stripe pattern 102 are adjacent to one another. A portion 103 located at a boundary between the first stripe pattern 101 and the second stripe pattern 102 tends not to be recognized as an edge by human senses.

On the contrary, since the regions with low luminance and the regions with high luminance are adjacent to one another, the portion 103 is recognized as an edge when the edge is detected by using only the luminance difference. However, the edge line detection part 23 determines the portion 103 as an edge line only when the luminance differences are detected in the portion 103 and there is the continuity in the attributes of the luminance differences. Accordingly, the edge line detection part 23 can suppress such erroneous determination that the portion 103 which is not recognized as an edge by human senses is recognized as an edge line, and perform edge detection close to human senses.

Furthermore, when the luminance change of the edge line detected by the edge line detection part 23 is larger than the predetermined threshold, the three-dimensional object detection device 1 determines that the edge line is detected by erroneous determination. When the captured image acquired by the camera 10 is converted to the bird's eye view image, the three-dimensional object included in the captured image tends to appear in the bird's eye view image in a stretched state. For example, assume a case where the tire of the other vehicle V2 is stretched as described above. In this case, since the single portion of the tire is stretched, the luminance change in the bird's eye view image in the stretched direction tends to be small. On the other hand, when characters drawn on the road surface and the like are erroneously determined as an edge line, regions with high luminance such as character portions and regions with low luminance such as road surface portions are included together in the bird's eye view image. In this case, the luminance change in the stretched direction tends to be large in the bird's eye view image. Accordingly, the three-dimensional object detection device 1 can recognize the edge line detected by erroneous determination by determining the luminance change in the bird's eye view image along the edge line. The three-dimensional object detection accuracy can be thus improved.

Next, a three-dimensional object detection device 1 of a second embodiment is described. Note that parts which are similar to those of the first embodiment described above are denoted by the same reference numerals and detailed description thereof is omitted accordingly.

The three-dimensional object detection device 1 shown as the second embodiment is different from the first embodiment in that the three-dimensional object detection device 1 detects a three-dimensional object by setting one vertical imaginary line in a bird's eye view image. The three-dimensional object detection device 1 calculates a luminance difference between two pixels equidistant from the vertical imaginary line in an actual space with a luminance difference calculation part 22.

Figure 10:
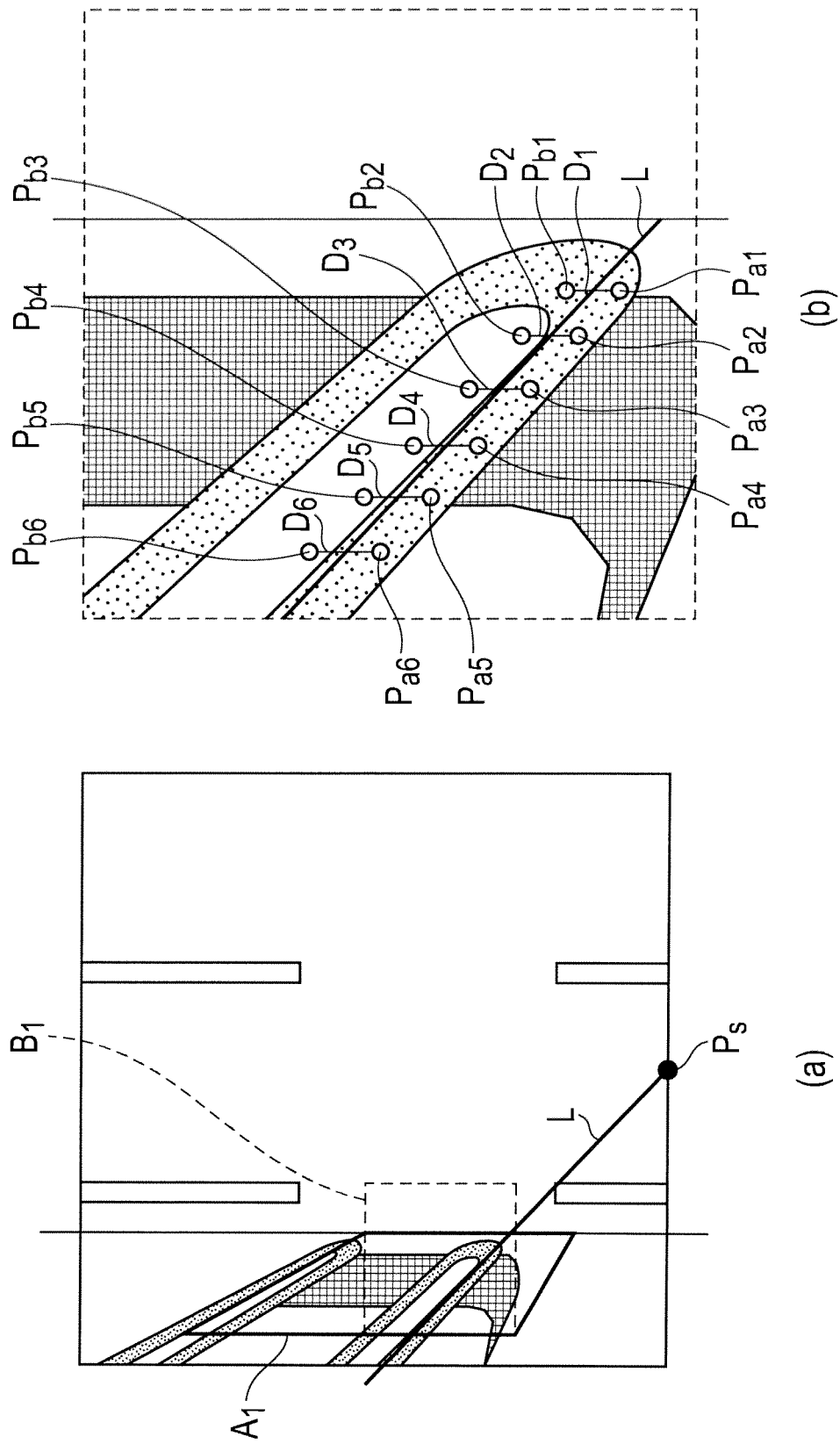
FIG. 10 is a view showing detailed operations of a luminance difference calculation part in a three-dimensional object detection device shown as a second embodiment, in which Part (a) shows a detection area in a bird's eye view image, and Part (b) is a view showing a positional relationship among a vertical imaginary line L, first reference points, and second reference points in the bird's eye view image.

Specifically, as shown in Part (a) of FIG. 10, one vertical imaginary line L extending from a position $P_s$ of a camera 10 in a vertical direction in the actual space is set. Although only one vertical imaginary line L is shown in FIG. 10, multiple vertical imaginary lines L are radially set in a detection area $A_1$. An area $B_1$ which is a portion of the detection area $A_1$ is shown in Part (b) of FIG. 10 in an enlarged manner. In FIG. 10, only the detection area $A_1$ is described for the convenience of description. However, similar processing is performed also for a detection area $A_2$.

As shown in Part (b) of FIG. 10, the luminance difference calculation part 22 sets pairs of two pixels respectively on both sides of the vertical imaginary line L in a horizontal direction in the actual space. Specifically, first reference points $P_{a1}$ to $P_{a6}$ (hereafter simply referred to as first reference point $P_{ai}$ when referring to an arbitrary point) are set at positions away from the vertical imaginary line L in the horizontal direction in the actual space and second reference points $P_{b1}$ to $P_{b6}$ are set on the opposite side of the vertical imaginary line L to the first reference points. To be more specific, the first reference points $P_{a1}$ to $P_{a6}$ and the second reference points $P_{b1}$ to $P_{b6}$ (hereafter referred to as second reference point $P_{bi}$ when referring to an arbitrary point) are set on lines radially extending from the position $P_s$ of the camera 10 like the vertical imaginary line L.

The luminance difference calculation part 22 performs setting in such a way that the distances between the first reference point $P_{ai}$ and the second reference point $P_{bi}$ in the actual space are the same. Accordingly, in the bird's eye view image, the distance in the image increases in the order of a distance $D_1$ between the pixel $P_{a1}$ and the pixel $P_{b1}$, a distance $D_2$ between the pixel $P_{a2}$ and the pixel $P_{b2}$, a distance $D_3$ between the pixel $P_{a3}$ and the pixel $P_{b3}$, a distance $D_4$ between the pixel $P_{a4}$ and the pixel $P_{b4}$, a distance $D_5$ between the pixel $P_{a5}$ and the pixel $P_{b5}$, and a distance $D_6$ between the pixel $P_{a6}$ and the pixel $P_{b6}$.

The luminance difference calculation part 22 thus sets the pairs of pixels $P_{ai}$ and $P_{bi}$ which are almost at the same height in the actual space at positions near the vertical imaginary line L and which are equidistant from the vertical imaginary line L in the actual space. The luminance difference calculation part 22 calculates the luminance difference between each pair of the pixels $P_{ai}$ and $P_{bi}$. The luminance difference calculation part 22 thereby calculates, for each of multiple positions along the vertical imaginary line L extending in the vertical direction in the actual space, the luminance difference between the pair of pixels near the position.

An edge line detection part 23 detects an edge line by using the luminance differences calculated by the luminance difference calculation part 22. A three-dimensional object detection part 24 detects the three-dimensional object by using the edge line detected by the edge line detection part 23.

Description is given of operations of the three-dimensional object detection device 1 described above with reference to FIGS. 11 and 12.

Figure 11:
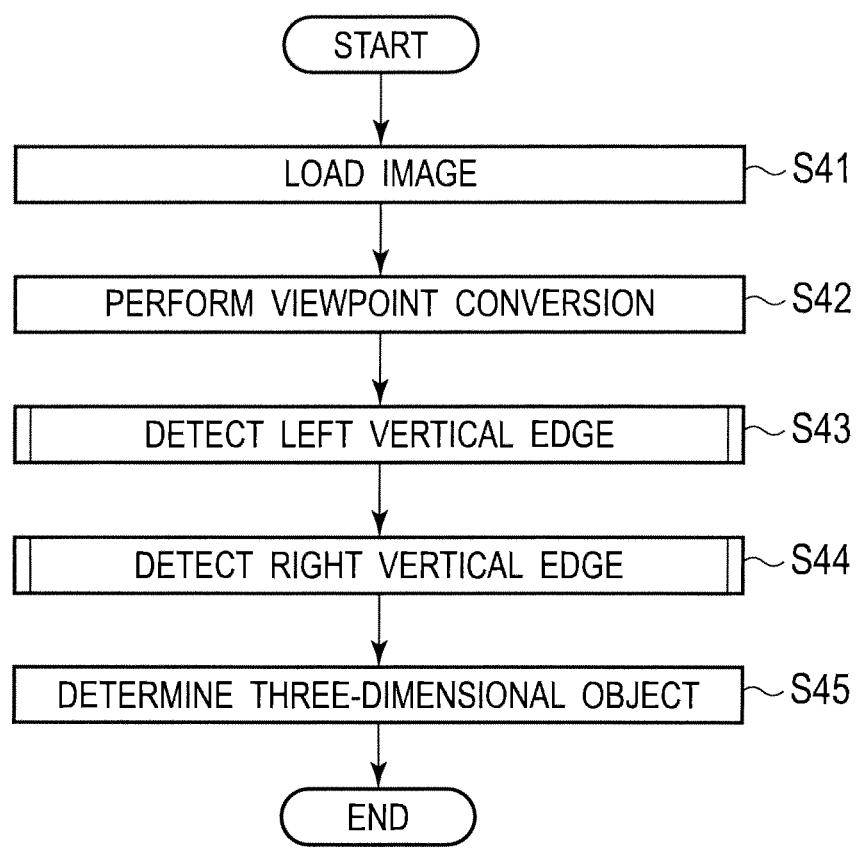
FIG. 11 is a flowchart showing an overall operation in the three-dimensional object detection device shown as the second embodiment.

In FIG. 11, first in step S41, captured image data captured by the camera 10 is loaded into a calculator 20.

In subsequent step S42, a viewpoint conversion part 21 performs viewpoint conversion processing on the captured image data loaded in step S41. The viewpoint conversion part 21 thereby creates bird's eye view image data.

In subsequent step S43, the luminance difference calculation part 22 and the edge line detection part 23 detect an edge line (left vertical edge) by using the first reference point $P_{ai}$ (left reference point) set on the left side of the vertical imaginary line L. In subsequent step S44, the luminance difference calculation part 22 and the edge line detection part 23 detect an edge line (right vertical edge) by using the second reference points $P_{bi}$ (right reference points) set on the right side of the vertical imaginary line L. Processing in steps S43 and S44 is described later with reference to FIG. 12.

In subsequent step S45, the three-dimensional object detection part 24 detects the three-dimensional object in the detection area $A_1$ by using the left vertical edge detected in step S43 and the right vertical edge detected in step S44.

Figure 12:
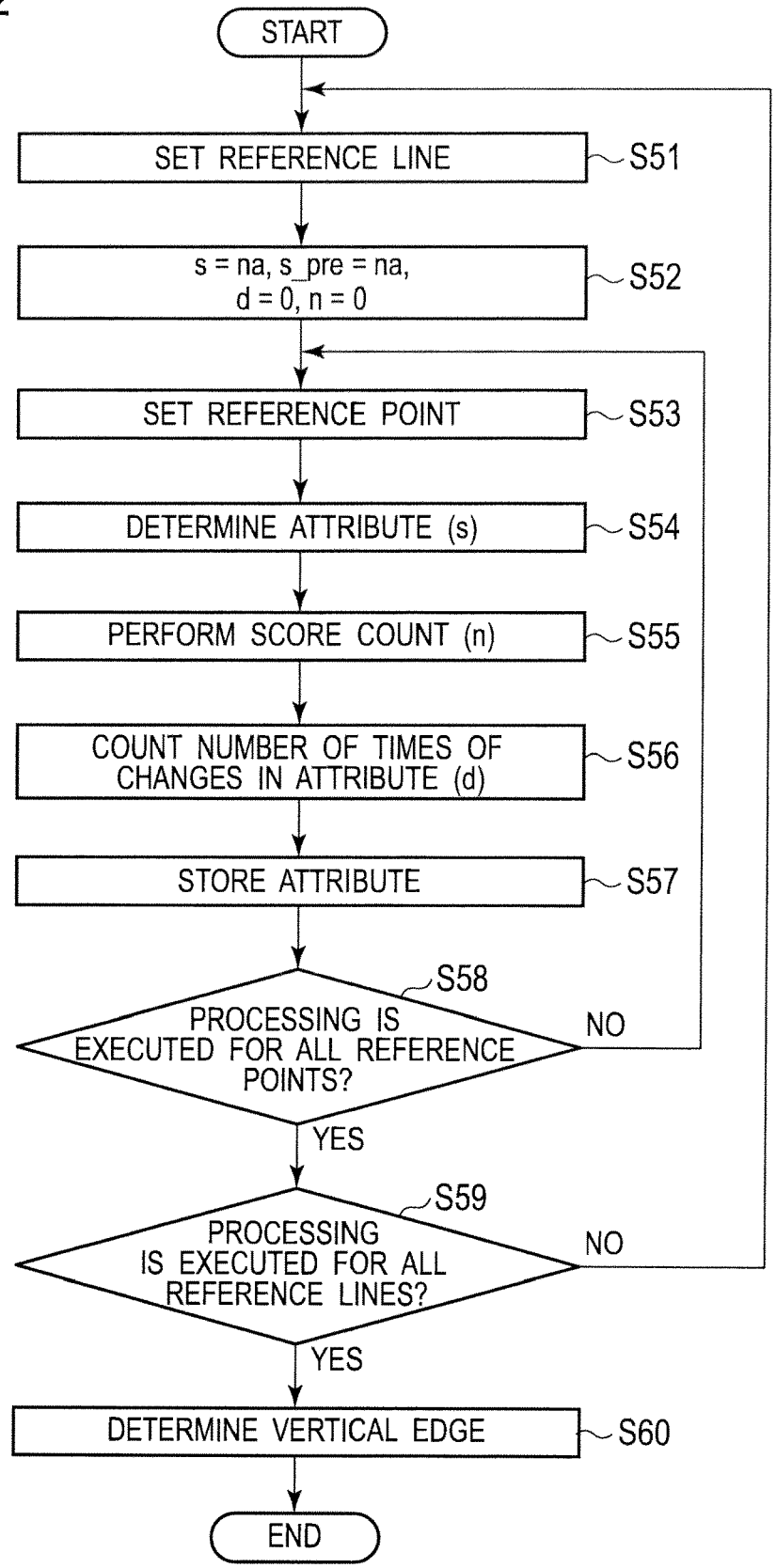
FIG. 12 is a flowchart showing a detection operation for a vertical edge which is performed by the three-dimensional object detection device shown as the second embodiment.

Next, processing of detecting the left vertical edge and the right vertical edge is described with reference to FIG. 12. In the description of FIG. 12, the left vertical edge and the right vertical edge are collectively referred to as "vertical edge".

First, in step S51, the luminance difference calculation part 22 sets the vertical imaginary line L serving as a reference for setting the first reference point $P_{ai}$ and the second reference point $P_{bi}$. The vertical imaginary line L is set to extend in a radial direction passing through the position $P_s$ of the camera 10 and to extend in the vertical direction in the actual space. Every time the processing of step S51 is performed, the vertical imaginary line L is set to pass an inner-side line of the detection area $A_1$ at a predetermined interval.

In subsequent step S52, an attribute s, a previous value s_pre of the attribute s, a count d for the number of times of changes, and a score count n are initialized.

In subsequent step S53, the luminance difference calculation part 22 sets the first reference point $P_{ai}$ and the second reference point $P_{bi}$. At this time, as shown in Part (b) of FIG. 10, the luminance difference calculation part 22 sets the reference points in such a way that the reference points are respectively on both sides of the vertical imaginary line L and are equidistant from the vertical imaginary line L at the same height in the actual space. The luminance difference calculation part 22 thus sets the first reference point $P_{ai}$ and the second reference point $P_{bi}$ in such a way that the distance therebetween becomes larger toward the outside in the detection area $A_1$.

In subsequent step S54, determination of the attribute s (luminance pattern) is performed for each of positions in the vertical imaginary line L. At this time, the luminance difference calculation part 22 obtains the luminance difference between the first reference point $P_{ai}$ and the second reference point $P_{bi}$. The edge line detection part 23 sets the attribute s (luminance pattern) in accordance with the relationship of the luminance difference obtained by the luminance difference calculation part 22 and with Formula (1) shown above. This attribute s is an attribute s of a position where a line segment connecting the first reference point $P_{ai}$ and the second reference point $P_{bi}$ intersects the vertical imaginary line L.

When the luminance of the first reference point $P_{ai}$ is larger than that of the second reference point $P_{bi}$ by a threshold t or more, the attribute s is "1". Meanwhile, when the luminance value of the first reference point $P_{ai}$ is smaller than a luminance value obtained by subtracting the threshold t from the luminance value of the second reference point $P_{bi}$, the attribute s is "−1". When the relationship between the luminance value of the first reference point $P_{ai}$ and the luminance value of the second reference point $P_{bi}$ is other than those described above, the attribute s is "0".

In subsequent step S55, the edge line detection part 23 increments a score n only when the attribute s is a predetermined value in step S54. The predetermined value of the attribute s may be "1" or "−1". In other words, the edge line detection part 23 counts a total number of times when one of the first reference point $P_{ai}$ and the second reference point $P_{bi}$ is brighter or darker than the other. The edge line detection part 23 does not increment the score n when the attribute s is "0".

In subsequent step S56, the edge line detection part 23 counts the number d of times of changes in the attribute s. At this time, the edge line detection part 23 compares the attribute s determined in the latest step S54 with the attribute s_pre determined in the previous step S54. The attribute s_pre is an attribute s obtained from the first reference point $P_{ai}$ and the second reference point $P_{bi}$ which are adjacent to the first reference point $P_{ai}$ and the second reference point $P_{bi}$ used to obtain the attribute s along the vertical imaginary line L. When the value of the attribute s and the value of the attribute s_pre are the same, the number d of times of changes is incremented.

In subsequent step S57, the edge line detection part 23 stores the attribute s.

In subsequent step S58, the edge line detection part 23 determines whether the processing of steps S53 to S57 is executed for all of the reference points set for the vertical imaginary line L as the reference line set in step S51. When the processing is not executed for all of the reference points, the processing returns to step S53. When step S53 is repeated, the next reference points are set. Meanwhile, when the edge line detection part 23 determines that the processing is executed for all of the reference points, the processing proceeds to step S59. In step S59, the edge line detection part 23 determines whether the processing of steps S52 to S58 is executed for all of the vertical imaginary lines L set in the detection area $A_1$. When the edge line detection part 23 determines that the processing is not executed for all of the vertical imaginary lines L, the processing proceeds to step S51. When step S51 is repeated, the next vertical imaginary line L is set. Meanwhile, when the edge line detection part 23 determines that the processing is executed for all of the vertical imaginary lines L, the processing proceeds to step S60.

In step S60, the edge line detection part 23 determines the vertical edge appearing in the detection area $A_1$. At this time, the edge line detection part 23 determines the vertical edge on the basis of the score n indicating the number of times of determination of the same attribute s, a total number N of pairs of the first reference point $P_{ai}$ and the second reference point $P_{bi}$, and the number d of times of changes. Specifically, the edge line detection part 23 determines that the vertical imaginary line L is the vertical edge when score n/total number N>θ and 5>d are both satisfied.

In score n/total number N, the score n is normalized by dividing the score n by the total number of reference points. When the proportion of the number of times in which the relationships between the first reference point $P_{ai}$ and the second reference point $P_{bi}$ are determined to be the same (bright or dark) to the total number N of the reference points is large, it can be assumed that the vertical edge exists.

Moreover, when the number d of times of changes is smaller than an upper limit value (five in this example), the edge line detection part 23 can assume that the vertical imaginary line L is the vertical edge. The upper limit value of the number d of times of changes is set in consideration of the fact that an object in which the attribute s frequently changes in the detection area $A_1$ is likely to be any of roadside weeds, symbols and characters on the road surface, and the like. Accordingly, the upper limit is preset based on an experiment and the like in such a way that the weeds, the symbols and characters on the road surface, and the like are not determined to be the vertical edge.

Meanwhile, when the conditions described above are not satisfied, the edge line detection part 23 determines that the vertical imaginary line L is not the vertical edge.

As described above, like in the first embodiment, the three-dimensional object detection device 1 sets the vertical imaginary line extending in the vertical direction in the actual space and detects the three-dimensional object on the basis of continuities of the luminance differences. Accordingly, the detection accuracy of the three-dimensional object can be improved.

Moreover, in the three-dimensional object detection device 1, two points of the first reference point $P_{ai}$ and the second reference point $P_{bi}$ are set for one vertical imaginary line L and the distance in the image between the first reference point $P_{ai}$ and the second reference point $P_{bi}$ is defined as the distance in the actual space. Accordingly, the three-dimensional object detection device 1 can detect the three-dimensional object by detecting the vertical edge without providing two lines of the attention line $L_a$ and the reference line $L_r$ as in the first embodiment. Hence, the processing load can be reduced in the three-dimensional object detection device 1 as compared to the first embodiment.

Figure 13:
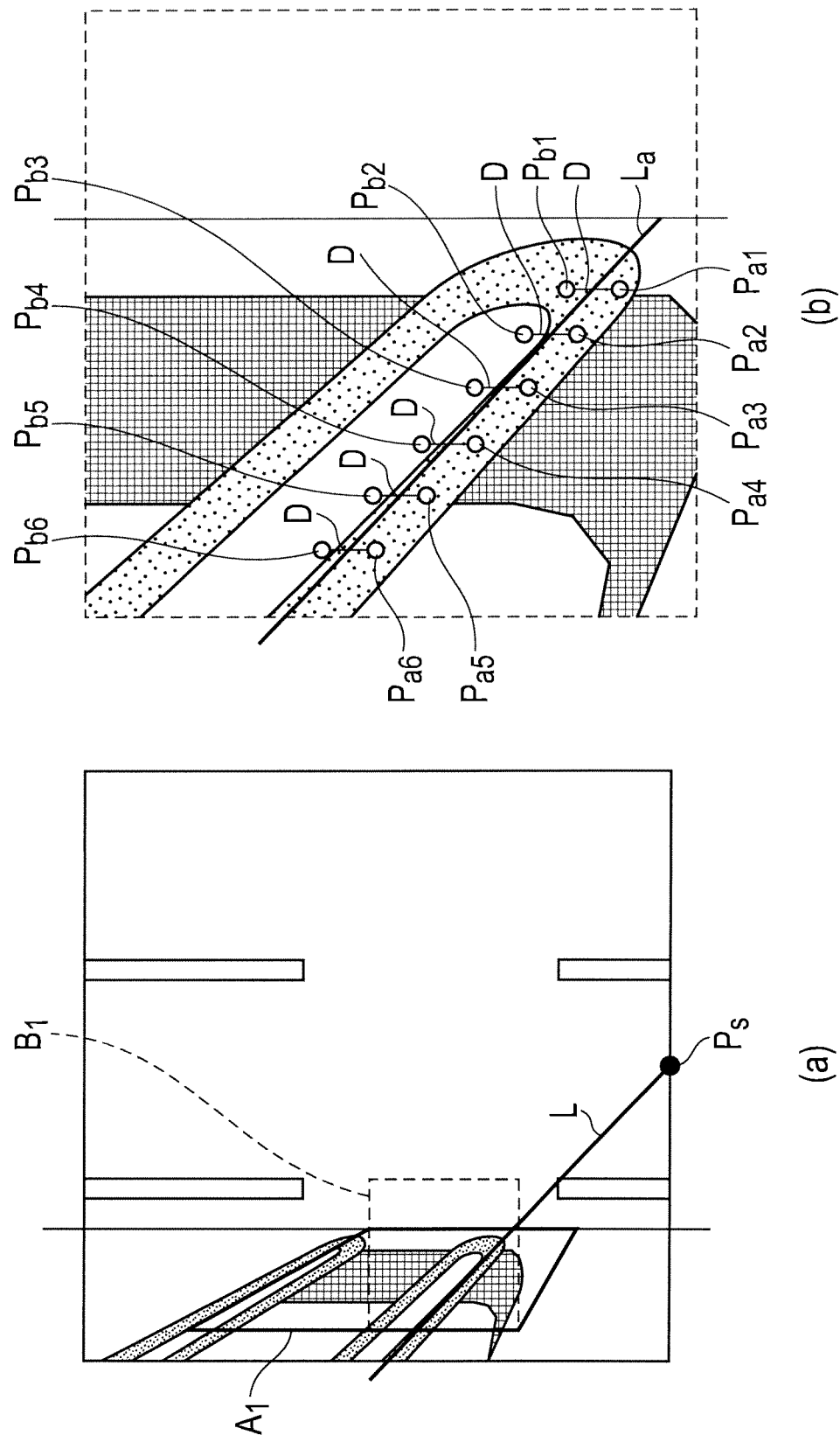
FIG. 13 is a different view showing the detailed operations of the luminance difference calculation part in the three-dimensional object detection device shown as the second embodiment, in which Part (a) shows the detection area in the bird's eye view image, and Part (b) is a view showing a positional relationship among the vertical imaginary line L, the first reference points, and the second reference points in the bird's eye view image.

Next, description is given of another three-dimensional object detection device 1 shown as the second embodiment. This three-dimensional object detection device 1 shown as the second embodiment is the same as the three-dimensional object detection device 1 described above in that only one vertical imaginary line L is set. As shown in Part (b) of FIG. 13 which shows a portion of a bird's eye view image shown in Part (a) of FIG. 13 in an enlarged manner, the three-dimensional object detection device 1 sets all of distances between the first reference points $P_{ai}$ and the second reference points $P_{bi}$ which are set in the bird's eye view image along the vertical imaginary line L to the same distance D.

Figure 14:
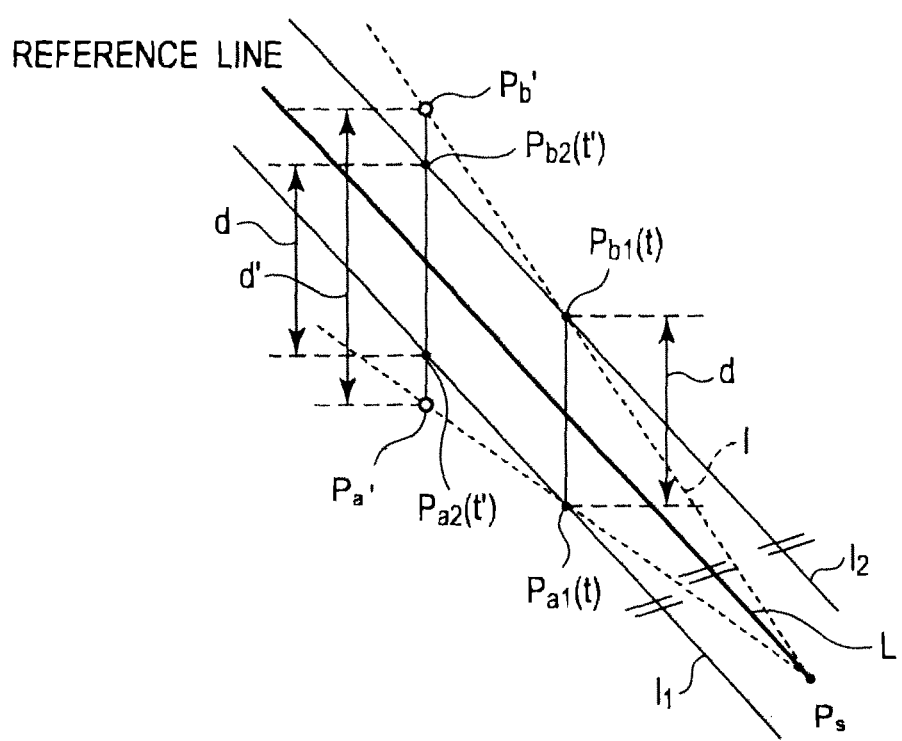
FIG. 14 is an explanatory diagram of changing a threshold depending on the relationship among the vertical imaginary line, the first reference points, and the second reference points, in the three-dimensional object detection device shown as the second embodiment.

Specifically, as shown in FIG. 14, the luminance difference calculation part 22 sets the vertical imaginary line L to radially extend from the position $P_s$ of the camera 10. Meanwhile, the luminance difference calculation part 22 sets an imaginary line $I_1$ on which the first reference point $P_{ai}$ is disposed and an imaginary line $I_2$ on which the second reference point $P_{bi}$ is disposed in such a way that the imaginary lines $I_1$ and $I_2$ are parallel to the vertical imaginary line L. In the imaginary lines $I_1$ and $I_2$, the reference points $P_{a1}$ and $P_{b1}$ in the detection area $A_1$ which are closest to the vertical imaginary line L are set at positions where the imaginary lines $I_1$ and $I_2$ intersect radial imaginary lines I extending in the vertical direction from the position $P_s$ of the camera 10.

When the first reference point $P_{ai}$ and the second reference point $P_{bi}$ are set as described above, both the distance between the first reference point $P_{a1}$ and the second reference point $P_{b1}$ and the distance between the first reference point $P_{a2}$ and the second reference point $P_{b2}$ are d. Meanwhile, the distance between points Pa' and Pb' which are on the radial imaginary line I extending from the position $P_s$ of the camera and which are on a line connecting the first reference point $P_{a2}$ and the second reference point $P_{b2}$ are d' which is longer than d. The threshold t for determining the attribute s is thereby set to be smaller toward the outside in the detection area $A_1$ (as the distance from the vehicle V1 becomes larger). Specifically, the threshold t for determining the attribute s of the first reference point $P_{a1}$ and the second reference point $P_{b1}$ is set to a value larger than a threshold t' for determining the attribute s of the first reference point $P_{a2}$ and the second reference point $P_{b2}$. Moreover, t' is defined as t×(d/d'). The edge line detection part 23 thus determines the attribute s of each position on the vertical imaginary line L by performing calculation similar to Formula (1) shown above.

In other words, the edge line detection part 23 sets the threshold t for each pair of the first reference point $P_{ai}$ and the second reference point $P_{bi}$. Then, when the luminance value of the first reference point $P_{ai}$ is higher than the luminance value obtained by adding the threshold t to the luminance value of the second reference point $P_{bi}$, the attribute s(xi, yi) is "1". Meanwhile, when the luminance value of the first reference point $P_{ai}$ is smaller than the luminance value obtained by subtracting the threshold t from the luminance value of the second reference point $P_{bi}$, the attribute s(xi, yi) is "−1". When the relationship between the luminance value of the first reference point $P_{ai}$ and the luminance value of the second reference point $P_{bi}$ is other than those described above, the attribute s(xi, yi) is "0".

Figure 15:
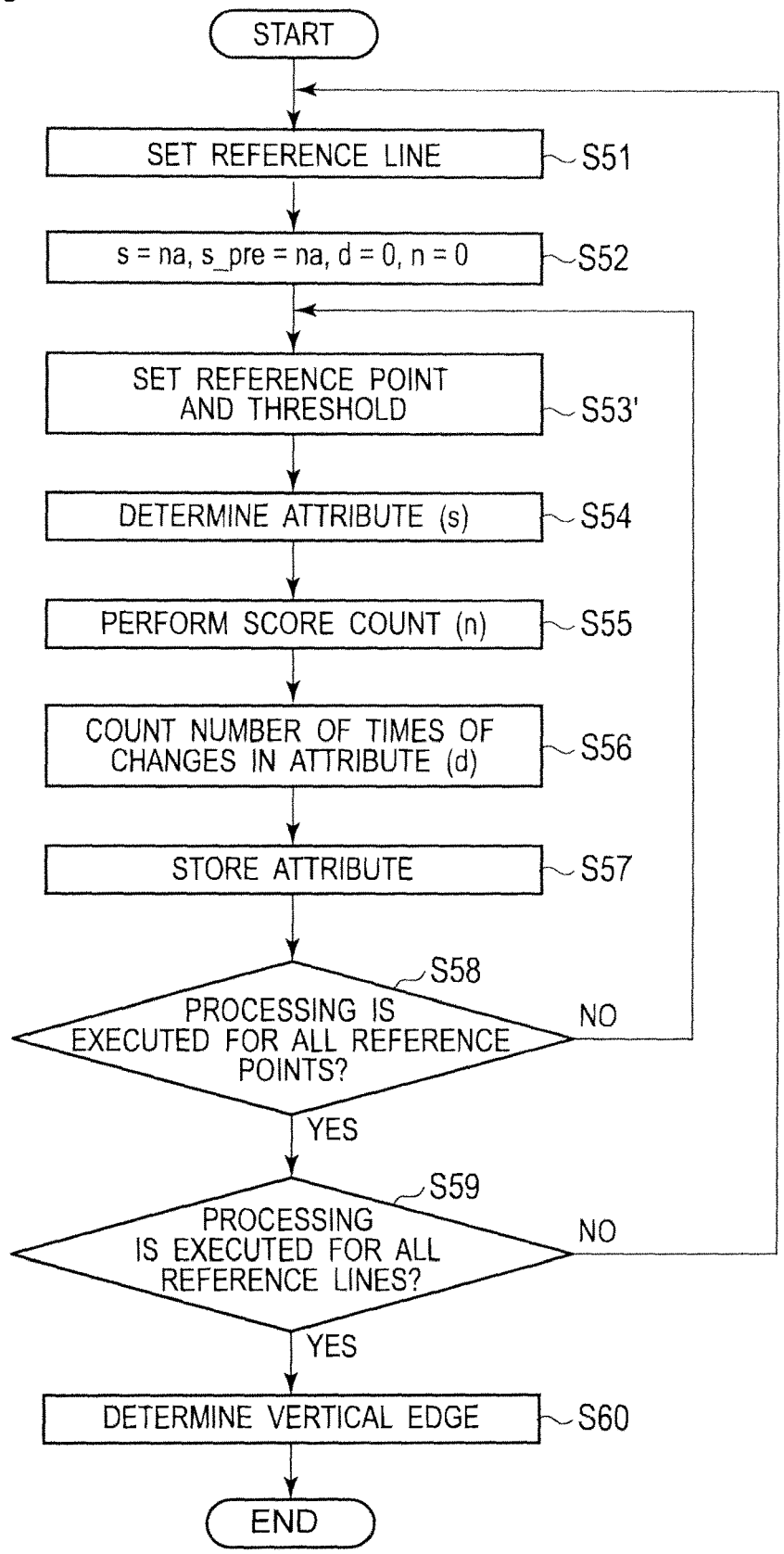
FIG. 15 is a flowchart showing a different detection operation of the vertical edge which is performed by the three-dimensional object detection device shown as the second embodiment.

The three-dimensional object detection device 1 described above detects the vertical edge by performing operations shown in FIG. 15. The operations of the three-dimensional object detection device 1 are different from the operations shown in FIG. 12 in having step S53' instead.

In step S53', the luminance difference calculation part 22 sets the first reference point $P_{ai}$ and the second reference point $P_{bi}$ respectively on the imaginary lines $I_1$ and $I_2$ provided parallel to the vertical imaginary line L. Moreover, the luminance difference calculation part 22 sets the threshold t for each pair of the set first reference point $P_{ai}$ and the set second reference point $P_{bi}$. Thus, in step S54, the edge line detection part 23 compares the luminance difference between the first reference point $P_{ai}$ and the second reference point $P_{bi}$ and the threshold t set for this pair of the first reference point $P_{ai}$ and the second reference point $P_{bi}$ and determines the attribute s.

As described above, like in the first embodiment, the three-dimensional object detection device 1 sets the vertical imaginary line extending in the vertical direction in the actual space and detects the three-dimensional object on the basis of the continuities of the luminance differences. Accordingly, the detection accuracy of the three-dimensional object can be improved.

Moreover, the three-dimensional object detection device 1 calculates the luminance difference between the two pixels equidistant from the vertical imaginary line L in the bird's eye view image and sets the threshold for determining the three-dimensional object on the basis of the luminance difference in such a way that the threshold becomes smaller as the position among the multiple positions along the vertical imaginary line L in the actual space becomes higher. Accordingly, even when an image of a higher portion in the actual space is stretched due to the viewpoint conversion of a captured image, the three-dimensional object detection device 1 can change the threshold t and detect the edge. Moreover, the three-dimensional object detection device 1 can detect the three-dimensional object by detecting the vertical edge, without providing two lines of the attention line $L_a$ and the reference line $L_r$ as in the first embodiment. Hence, the processing load can be reduced in the three-dimensional object detection device 1 as compared to the first embodiment.

Note that, even when the three-dimensional object detection device 1 detects the luminance difference between two pixels on both sides of the vertical imaginary line while changing the position on the vertical imaginary line with the threshold being fixed, the three-dimensional object detection device 1 can still detect the edge line extending in the vertical direction and detect the three-dimensional object.

Next, a three-dimensional object detection device 1 of a third embodiment is described. Note that parts which are similar to those of the embodiments described above are denoted by the same reference numerals and detailed description thereof is omitted accordingly.

Figure 16:
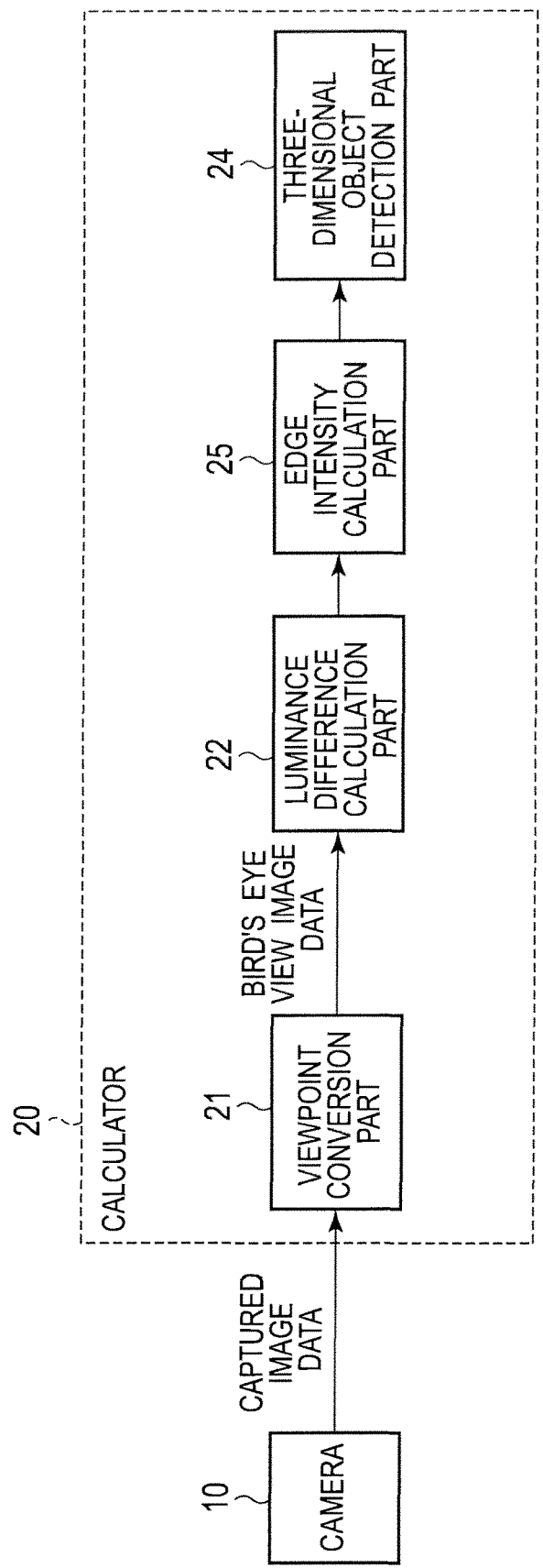
FIG. 16 is a block diagram showing a functional configuration of a three-dimensional object detection device shown as a third embodiment.

FIG. 16 is a block diagram showing a functional configuration of a calculator 20 in the three-dimensional object detection device 1 of the third embodiment. In FIG. 16, the camera 10 is also illustrated to clarify the connection relationship.

As shown in FIG. 16, the calculator 20 includes an edge intensity calculation part (edge intensity calculation means) 25 instead of the edge line detection part 23 of the first embodiment.

The edge intensity calculation part 25 calculates an edge intensity of an attention line $L_a$ from continuous luminance differences calculated by a luminance difference calculation part 22. The edge intensity is a numeric value indicating likelihood of being an edge line. Specifically, the edge intensity is calculated from Formula (7) shown below.

[Formula 7]

$$\Sigma c(xi, yi)/N \quad (7)$$

In Formula (7) shown above, c(xi, yi) is a continuity c of an attribute of an attention point $P_{ai}$. N is the number of attention points $P_a$ set on the attention line $L_a$. In Formula (7), the edge intensity is a value obtained by dividing the sum of continuities c of each attention line $L_a$ by the set number of attention points $P_a$.

Figure 17:
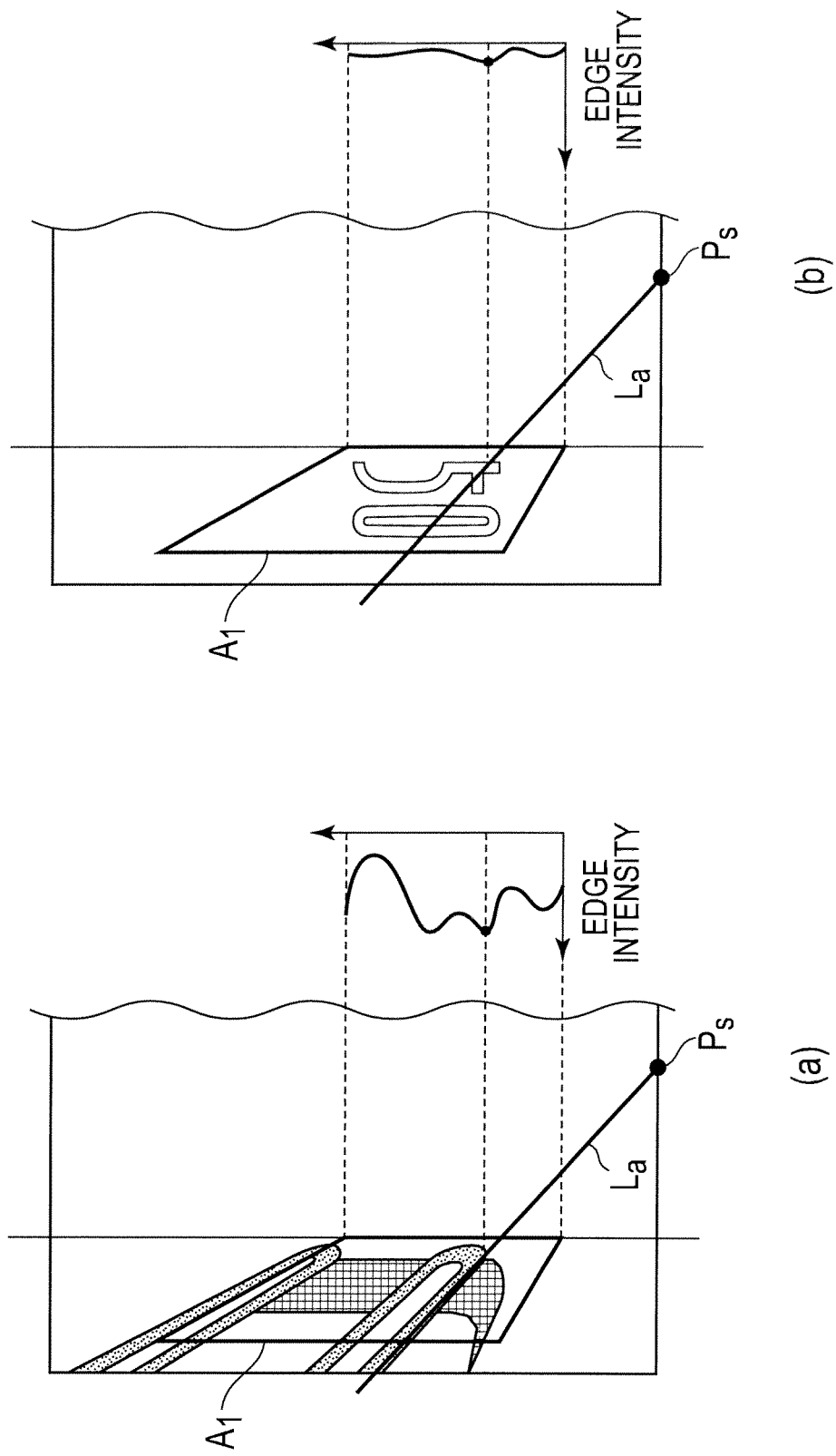
FIG. 17 is a view showing operations of an edge intensity calculation part in the three-dimensional object detection device shown as the third embodiment, in which Part (a) is a view showing a relationship among a detection area, an attention line $L_a$, and edge intensity in a bird's eye view image in which a three-dimensional object exists, and Part (b) is a view showing a relationship among the detection area, the attention line $L_a$, and the edge intensity in a bird's eye view image in which no three-dimensional object exists.

FIG. 17 is a schematic view showing processing performed by the edge intensity calculation part 25 shown in FIG. 16. Part (a) of FIG. 17 shows the edge intensity in the case where another vehicle V2 as a three-dimensional object exists in a detection area $A_1$. Part (b) of FIG. 17 shows the edge intensity in the case where no three-dimensional object exists in the detection area $A_1$. Although the edge intensity calculation part 25 is described in conjunction with an illustration of only the detection area $A_1$ in FIG. 17, similar processing can be performed also for a detection area $A_2$.

As shown Part (a) of FIG. 17, when the other vehicle V2 exists in the detection area $A_1$, the sum of continuities c of attributes of the attention points $P_a$ are high as described in Formula (7) shown above and the edge intensity of each attention line $L_a$ thus tends to be high. Accordingly, the sum of multiple edge intensities included in the detection area $A_1$ is high.

Meanwhile, as shown in Part (b) of FIG. 17, when no three-dimensional object exists in the detection area $A_1$, the sum of continuities c of attributes of the attention points $P_a$ is low as described in Formula (7) shown above and the edge intensity of each attention line $L_a$ thus tends to be low. Accordingly, the sum of multiple edge intensities included in the detection area $A_1$ is low.

As described above, when the sum of edge intensities of the attention lines $L_a$ is equal to or higher than a predetermined threshold, a three-dimensional object detection part 24 can determine the existence of the three-dimensional object in the detection area $A_1$. Incidentally, depending on an image capturing environment for the three-dimensional object and the like, an edge extending in a vertical direction in an actual space sometimes appears as a weak edge in a bird's eye view image. In this case, the three-dimensional object detecting device 1 may not be able to detect the three-dimensional object. However, since the three-dimensional object detection device 1 of the third embodiment detects the three-dimensional object on the basis of the edge intensities, the three-dimensional object detection device 1 can detect the three-dimensional object even when only weak edges appear in the bird's eye view image by gathering the weak edges in large numbers.

Figure 18:
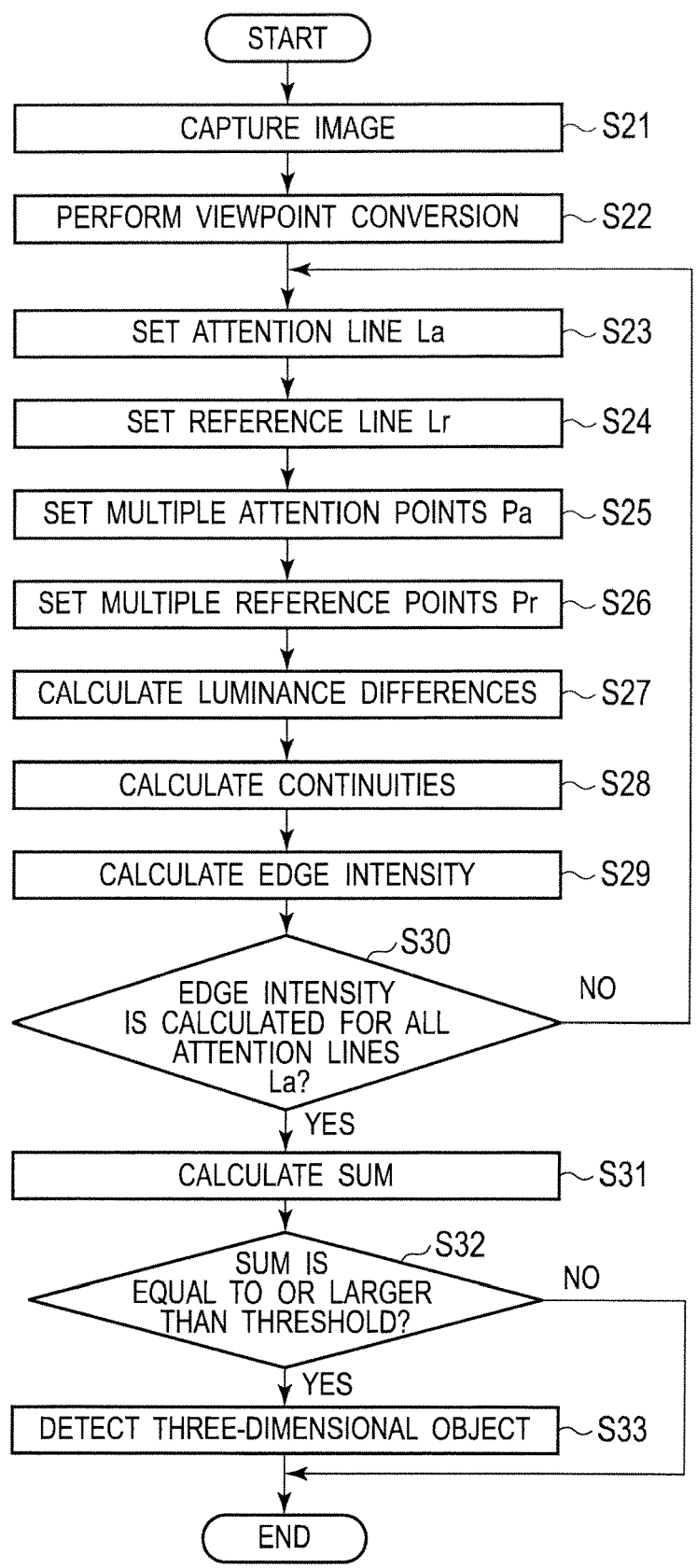
FIG. 18 is a flowchart showing operation procedures performed by the three-dimensional object detection device shown as the third embodiment.

FIG. 18 is a flowchart showing details of a three-dimensional object detection method of the third embodiment. In FIG. 18, description is given of processing for the detection area $A_1$ for the sake of convenience. However, similar processing can be performed for the detection area $A_2$.

In processing of steps S21 to S28, the three-dimensional object detection device 1 first executes processing similar to that in steps S1 to S8 shown in FIG. 7.

In step S29 subsequent to step S28, the edge intensity calculation part 25 calculates the edge intensity in accordance with Formula (7) shown above.

Next, in step S30, the calculator 20 determines whether the edge intensities are calculated for all of the attention lines $L_a$ which can be set in the detection area $A_1$. It is determined whether the edge intensities are calculated for all of the attention lines $L_a$ which can be set in the detection area $A_1$ for all of the attention lines $L_a$. When the calculator 20 determines that the edge intensities are not calculated for all of the attention lines $L_a$ (S30: NO), the processing proceeds to step S23. On the other hand, when the calculator 20 determines that the edge intensities are calculated for all of the attention lines $L_a$ (S30: YES), the processing proceeds to step S31.

In step S31, the three-dimensional object detection part 24 calculates the sum of the edge intensities calculated by the edge intensity calculation part 25.

Next, in step S32, the three-dimensional object detection part 24 determines whether the sum of the edge intensities calculated in step S31 is equal to or higher than the threshold. When the sum of the edge intensities is determined to be equal to or higher than the threshold (S32: YES), the three-dimensional object detection part 24 detects the existence of the three-dimensional object in the detection area $A_1$ in step S33. Meanwhile, when the sum of the edge intensities is determined to be not equal to or higher than the threshold (S32: NO), the three-dimensional object detection part 24 determines that no three-dimensional object exists in the detection area $A_1$. Thereafter, the processing shown in FIG. 18 is terminated.

As described above, in the three-dimensional object detection device 1 and the three-dimensional object detection method of the third embodiment, like in the first embodiment, the vertical imaginary line extending in the vertical direction in the actual space is set and the three-dimensional object is detected based on the continuities of the luminance differences. Accordingly, the detection accuracy of the three-dimensional object can be improved.

Moreover, in the three-dimensional object detection device 1 of the third embodiment, the edge intensities of the attention lines $L_a$ are calculated from the continuous luminance differences acquired by setting the vertical imaginary line and the three-dimensional object is detected based on the edge intensities. Accordingly, even when the edges extending in the vertical direction appear as weak edges in the image due to the image capturing environment for the three-dimensional object and the like, the three-dimensional object detection device 1 can suppress a failure to detect the three-dimensional object. Specifically, even when the edges which appear in the bird's eye view image and which extend in the vertical direction in the actual space are weak, the three-dimensional object detection device 1 can detect the three-dimensional object on the basis of the edge intensities by gathering the weak edges in large numbers. Accordingly, the three-dimensional object detection device 1 can suppress a situation where the detection accuracy of the three-dimensional object deteriorates due to the image capturing environment and the like.

The embodiments described above are certain examples of the present invention. Accordingly, the present invention is not limited to the embodiments described above. As a matter of course, embodiments other than those described above are possible and various changes can be made depending on the design and the like within the scope of the technical idea of the present invention.

For example, in the embodiments described above, the calculator 20 includes the viewpoint conversion part 21 to generate the bird's eye view image data. However, the present invention is not limited to this configuration. There is no need to definitely create the bird's eye view image data as long as processing similar to that in the embodiments described above is executed for the captured image data.

INDUSTRIAL APPLICABILITY

The present invention can be used in industrial fields in which a three-dimensional object in the surroundings is detected.

REFERENCE SIGNS LIST

1 three-dimensional object detection device
10 camera
20 calculator
21 viewpoint conversion part
22 luminance difference calculation part
23 edge line detection part
24 three-dimensional object detection part
25 edge intensity calculation part

The invention claimed is:

1. A three-dimensional object detection device comprising:
  a camera that captures a single image of a predetermined area;
  a computer programmed to
    perform viewpoint conversion processing on the image captured by the camera to create a conversion image viewed from above,
    set a line segment extending in a vertical direction in an actual space as a vertical imaginary line in the conversion image, set two pixels at the same height in the actual space for each of a plurality of positions along the vertical imaginary line, and calculate a luminance difference in the conversion image between the two pixels set for each of the plurality of positions along the vertical imaginary line,
    detect an edge line on the basis of continuities of the luminance differences among the plurality of positions, and detect a three-dimensional object on the basis of the edge line.

2. The three-dimensional object detection device according to claim 1, wherein
  the vertical imaginary line consists of a first vertical imaginary line which extends in the vertical direction in the actual space and a second vertical imaginary line which is away from the first vertical imaginary line by a predetermined distance in the actual space and which extends in the vertical direction in the actual space, and the computer calculates the luminance differences between a pixel on the first vertical imaginary line and a pixel on the second vertical imaginary line.

3. The three-dimensional object detection device according to claim 1, wherein the computer calculates the luminance difference between the two pixels which are equidistant from the vertical imaginary line in the actual space.

4. The three-dimensional object detection device according to claim 1, wherein the computer calculates the luminance difference between the two pixels which are equidistant from the vertical imaginary line in the conversion image, and the computer sets a smaller threshold for a higher position among the plurality of positions along the vertical imaginary line in the actual space, and a threshold for determining the three-dimensional object on the basis of the luminance difference is calculated by the computer.

5. The three-dimensional object detection device according to claim 1, wherein the computer detects the three-dimensional object on the basis of a quantity of the edge lines.

6. The three-dimensional object detection device according to claim 5, wherein the computer adds an attribute to each of the positions on the vertical imaginary line on the basis of the luminance difference of the position on the vertical imaginary line, and the computer determines whether the vertical imaginary line is the edge line on the basis of continuities of the attributes.

7. The three-dimensional object detection device according to claim 5, wherein when the change in luminance of pixels along any of the edge lines detected by the computer is larger than a predetermined value, the computer avoids using the edge line for detection of the three-dimensional object.

8. The three-dimensional object detection device according to claim 1, wherein:

the computer calculates an edge intensity of the vertical imaginary line on the basis of the luminance difference, and the computer detects the three-dimensional object based on a sum of edge intensities.

9. A three-dimensional object detection method comprising:

capturing a single image of a predetermined area;

performing viewpoint conversion processing on the captured image to create a conversion image viewed from above;

setting a line segment extending in a vertical direction in an actual space as a vertical imaginary line in the conversion image, setting two pixels at the same height in the actual space for each of a plurality of positions along the vertical imaginary line, and calculating a luminance difference between the two pixels set for each of the plurality of positions along the vertical imaginary line in the conversion image;

detecting an edge line on the basis of continuities of the luminance differences among the plurality of positions; and detecting a three-dimensional object on the basis of the edge line.

10. A three-dimensional object detection method, comprising:

capturing a single image of a predetermined area;

performing viewpoint conversion processing on the captured image to create a conversion image viewed from above;

setting a line segment extending in a vertical direction in an actual space as a vertical imaginary line in the conversion image, setting two pixels at the same height in the actual space for each of a plurality of positions along the vertical imaginary line, and calculating a luminance difference between the two pixels set for each of the plurality of positions along the vertical imaginary line in the conversion image; and detecting an edge line on the basis of continuities of the luminance differences among the plurality of positions, and detecting a three-dimensional object on the basis of the edge line.

11. A three-dimensional object detection method, comprising:

capturing a single image of a predetermined area;

performing viewpoint conversion processing on the captured image to create a conversion image viewed from above;

setting a line segment extending in a vertical direction in an actual space as a vertical imaginary line in the conversion image, setting two pixels at the same height in the actual space for each of a plurality of positions along the vertical imaginary line, and calculating a luminance difference between the two pixels set for each of the plurality of positions along the vertical imaginary line in the conversion image;

detecting an edge line on the basis of continuities of the luminance differences among the plurality of positions, and detecting a three-dimensional object on the basis of the edge line.

* * * * *